US012391165B1

(12) United States Patent
Nicklos et al.

(10) Patent No.: US 12,391,165 B1
(45) Date of Patent: Aug. 19, 2025

(54) ITEM DISPENSING VEHICLE WITH SELECTIVELY CONTROLLABLE BAYS

(71) Applicant: Amazon Technologies, Inc., Seattle, WA (US)

(72) Inventors: Carl Nicklos, Washougal, WA (US); Patrick Chow, Issaquah, WA (US); Jia Hao Lim, Seattle, WA (US); Alan Baird, Seattle, WA (US); Brett Halper, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 18/079,330

(22) Filed: Dec. 12, 2022

Related U.S. Application Data

(60) Provisional application No. 63/356,270, filed on Jun. 28, 2022.

(51) Int. Cl.
*B60P 1/38* (2006.01)
*B62D 33/04* (2006.01)

(52) U.S. Cl.
CPC .............. *B60P 1/38* (2013.01); *B62D 33/042* (2013.01)

(58) Field of Classification Search
CPC ................................. B60P 1/38; B62D 33/042
See application file for complete search history.

(56) References Cited

U.S. PATENT DOCUMENTS

| 3,754,711 | A | * | 8/1973 | Gledhill | A01C 15/00 |
| | | | | | 239/674 |
| 4,756,659 | A | * | 7/1988 | Bader | B60P 1/52 |
| | | | | | 414/502 |
| 5,902,090 | A | * | 5/1999 | Young | B60P 1/38 |
| | | | | | 198/570 |
| 8,813,882 | B2 | * | 8/2014 | Albright | B60P 1/38 |
| | | | | | 56/11.4 |
| 9,334,115 | B2 | * | 5/2016 | Bartelet | B64F 1/366 |
| 9,630,545 | B1 | * | 4/2017 | Corrigan | B60P 1/44 |
| 12,007,772 | B2 | * | 6/2024 | Senske | B64F 1/368 |
| 12,195,275 | B2 | * | 1/2025 | Eidsmore | B65G 1/06 |
| 2021/0072754 | A1 | * | 3/2021 | Senske | B60P 1/38 |

* cited by examiner

*Primary Examiner* — Jonathan Snelting
(74) *Attorney, Agent, or Firm* — Kilpatrick Townsend & Stockton LLP

(57) ABSTRACT

An item dispensing vehicle with selectively controllable bays is described herein. In an example, a system includes a first bay configured to retain a first set of items on a first set of conveyor belts that ends at a first opening. The system also includes a second bay configured to retain a second set of items on a second set of conveyor belts that ends at a second opening. The system additionally includes a divider positioned between the first bay and the second bay and a door comprising a third set of conveyor belts and operable between one or more open positions and a closed position. The door blocks the first opening and the second opening in the closed position. The first opening and the second opening can be at least partially unblocked in an open position of the one or more open positions.

28 Claims, 15 Drawing Sheets

ITEM DISPENSING VEHICLE WITH SELECTIVELY CONTROLLABLE BAYS

CROSS-REFERENCE TO RELATED APPLICATIONS

This application claims priority to U.S. Provisional Patent Application No. 63/356,270, filed Jun. 28, 2022, titled "ITEM DISPENSING VEHICLE WITH SELECTIVELY CONTROLLABLE BAYS".

BACKGROUND

Items may be moved from one location to another, such as for delivery at a particular location. Typically, delivering items is accomplished by human personnel. Recently, industry effort has been made to consider robotic devices.

BRIEF DESCRIPTION OF THE DRAWINGS

Various embodiments in accordance with the present disclosure will be described with reference to the drawings, in which.

DETAILED DESCRIPTION

Figure 1:
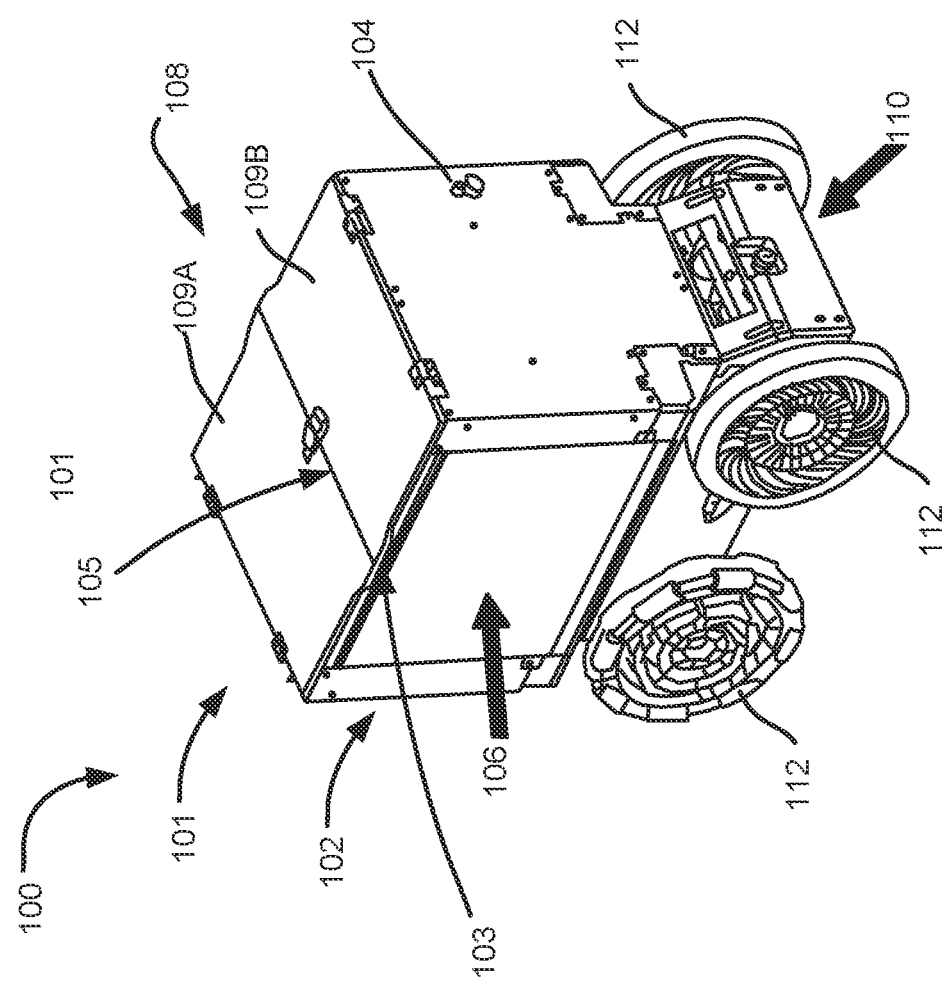
FIG. 1 illustrates an example of an item dispensing vehicle with selectively controllable bays in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an item dispensing vehicle with selectively controllable bays. Items may be loaded into the bays within an item dispensing housing. The bays can be separated by dividers. Each bay may be associated with a location at which item(s) from the bay may be dispensed. That is, one or more items retained in a first bay may be intended for dispensing by the item dispensing vehicle at a first location and one or more items retained in a second bay may be intended for dispensing at a second location. Each bay can include an item transporting medium (e.g., a set of conveyor belts). At a location at which a set of items are to be dispensed from a bay, only the item transporting medium associated with the bay may be operated. The number of item transporting media included in a bay can vary over time. The change can depend on the divider configuration to accommodate items with different dimensions (e.g., size and/or weight). For instance, if two bays were separated by a divider, the divider can be subsequently removed to form a larger bay. The individual conveyor belts of these two smaller bays are then associated with the larger bay. When the larger bay is used for dispensing a set of items, the individual item transporting media are jointly operated.

The item dispensing vehicle can include a computing device for controlling the operation of the conveyor belts. For example, the computer system can determine that a first set of items is to be dispensed from a first bay of the item dispensing housing. The computer system can then cause a door of the item dispensing housing to move to an open position, in which bays are at least partially unblocked. A first item transporting medium included in the door may be caused to operate in conjunction with a second item transporting medium included in the first bay. The computer system can cause item transporting media of remaining bays of the item dispensing housing to remain unoperated. The first set of items is moved from the first bay to the door via the second item transporting medium and from the door to a location outside of the item dispensing housing via the first item transporting medium.

To illustrate, consider an item dispensing vehicle delivering items to various locations, in which case the item dispensing vehicle may be referred to as a delivery vehicle. The item dispensing vehicle can be loaded with items in different bays and the item dispensing vehicle can store first information that associates conveyor belts and bays and second information that associates bays with delivery locations. The first information can be generated by the item dispensing vehicle based on presence and absence of dividers. The second information can be received by the item dispensing vehicle based on delivery locations of the items and the loading of the items into the bays. Upon reaching a delivery location in which an item retained in a bay is to be delivered, the item dispensing vehicle can operate a first motor to cause a door of the item dispensing vehicle to open from a closed position in which the bays are blocked. The item dispensing vehicle can then determine that, since the item is to be dispensed from the particular bay, a conveyer belt indicated in the first information is to be operated. The item dispensing vehicle can operate a second motor coupled with a driving shaft on which a set of clutches are attached. The item dispensing vehicle can cause a clutch associated with the conveyor belt to engage the conveyor belt (e.g., by being coupled with a rolling wheel of the conveyor belt). Likewise, if the bay is associated with multiple conveyor belts (as indicated by the first information), other clutches attached to the driving shaft are controlled to engage the corresponding conveyor belts. The second motor can also be coupled to a door conveyor belt to cause the door conveyor belt to operate simultaneously with the operated other conveyor belt(s) of the bay to dispense the item to the location. As such, one or more conveyor belts can be selectively operated based on the bay that needs to be operated and the configuration of the bay (e.g., the number of conveyor belts associated therewith). The bay configuration can be determined dynamically based on the presence and absence of dividers.

Embodiments of the present disclosure provide several technical advantages over conventional item dispensing vehicles. For example, conventional item dispensing vehicles may not be able to selectively control item transporting media for each bay and may not allow dynamic re-configuration of a bay to include a different number of item transporting media based on a dimension of an item to be retained in the bay. In contrast, embodiments of the present disclosure can allow this flexibility and scalability. Further, by using a set of item transporting media in a door, embodiments of the present ensure that an item is dispensed as desired. Further, the door can be operated at a particular open position based on a location at which the item is to be dispensed, which may reduce the risk of damaging the item due to the dispensing.

In the interest of clarity of explanation, various embodiments of the present disclosure are described in connection with conveyor belts. However, the embodiments are not limited as such. Instead, the embodiments similarly and equivalently apply to any type of item transporting medium. An item transporting medium represents a medium, such as hardware equipment, to transport an item from a first location to a second location. This medium can be used to hold the item, at least temporarily, and/or to perform handling operations thereon. A conveyor belt is one example of an item transporting medium. Other examples are possible, such as a set of rollers that some or all may be mechanically coupled together (e.g., via a belt or a chain). Generally, the item handling medium can be mechanically coupled with a driving shaft via a set of clutches and can be selectively and controllably operated based on the set of clutches. For example, and referring back to the set of rollers, at least one of the rollers can be mechanically coupled to a set of clutches. When at least one of the clutches is engaged, at least that roller can be operated causing an item to be transported.

FIG. 1 illustrates an example of an item dispensing vehicle 100 with selectively controllable bays in accordance with at least one embodiment. The item dispensing vehicle 100 may be used to deliver items to locations. For instance, the item dispensing vehicle 100 may be loaded with one or more items that are to be transported to one or more locations, and the item dispensing vehicle can travel to the one or more locations to deliver the items. The item dispensing vehicle 100 includes a computer system that is capable of supporting various computing services including, for instance, controlling movement, door positioning, and item dispensing. In particular, the computer system includes one or more processors, and one or more memories storing computer-readable instructions for an item dispensing service.

As illustrated, the item dispensing vehicle 100 includes a housing 101 and a movable base 110. The housing 101 is illustrated as being substantially rectangular, but may be any suitable shape. The housing 101 is mounted on the movable base 110 and is configured to retain and dispense items. The items can be loaded into the housing 101 via a top wall 108 of the housing 101. The top wall 108 is illustrated as including panels 109A-B that are openable such that the items can be placed inside the housing 101. One or both of the panels 109A-B may be opened for receiving items. Other item loading mechanisms are additionally or alternatively possible as described in the next paragraph.

An area 105 between the panels 109A-B may be water sealed for preventing water from entering an interior of the item dispensing vehicle 100. For example, each of the panels 109A-B may include a magnetic strip that couple together when the top wall 108 is closed to provide a water seal. A portion of the magnetic strip or a non-magnetic strip attached thereto may extend past the other magnetic strip to provide additional water sealing. Alternatively, one of the panels 109A-B may include a magnetic strip that is wide enough to cover at least a portion of the other panel when the panels 109A-B are closed to provide the seal.

The housing 101 of the item dispensing vehicle 100 also includes walls 102 and 104 and the door 106 that are each extend from an edge of the top wall 108. Wall 102 is opposite wall 104 with the door 106 between them. Although not shown in FIG. 1, either or both of the walls 102 and 104 may be openable such that items can be loaded into the item dispensing vehicle 100 via the walls 102 and 104. Additionally or alternatively, the door 106 may be opened prior to items being loaded and the items can be loaded through an opening defined by the door 106. Upon reaching a location where a loaded item is to be delivered, the item dispensing vehicle 100 can open the door 106 of the housing 101 and dispense the item, which is further described herein below.

The housing 101 can also include a camera 103 positioned on the top wall 108 over the door 106. The camera 103 may alternatively be positioned elsewhere on the housing 101, or the housing 101 may include multiple cameras distributed around the housing 101. The camera 103 may be oriented (e.g., downwards) to generate image data of an area surrounding the item dispensing vehicle 100. The camera 103 may be operated at different time in support of one or more operations, such as to monitor an item dispensing operation and such as to assist with the positioning of the item dispensing vehicle 100 relative to a surface, target, and/or obstacle. In an example, the camera 103 may generate images during and/or after items are dispensed by the item dispensing vehicle 100 at a delivery location. The images may be used to provide confirmation of item deliveries at delivery locations. Additionally or alternatively, image data generated by the camera 103 may be processed as the item dispensing vehicle 100 approaches a delivery location so that the item dispensing vehicle 100 can be positioned accurately relative to a delivery surface. For instance, the image data generated by the camera 103 may be used to guide the item dispensing vehicle 100 to a particular position at a delivery location or to determine a positioning of the door 106 relative to a delivery surface.

The movable base 110 can be mounted to a bottom surface of the housing 101. The movable base 110 includes wheels 112 for moving the item dispensing vehicle 100. While the item dispensing vehicle 100 includes four wheels, other examples of the item dispensing vehicle 100 may include any suitable number of wheels. Other possible installations of housing 101 relative to the base 110 are possible.

The item dispensing vehicle 100 can be operated in different use cases. One use case is for item deliveries. For instance, each item loaded in the item dispensing vehicle 100 can be associated with a delivery location. The item dispensing vehicle 100 moves between these delivery locations and deliver the items at the corresponding locations.

Although the item dispensing vehicle 100 is illustrated as a ground vehicle, the embodiments of the present disclosure are not limited as such. For instance, the embodiments (e.g., at least the housing 101 and the computer system) can be installed in an aerial vehicle or a maritime vehicle. Any of such vehicles can be autonomously operated (e.g., an unmanned aerial vehicle, an unmanned ground vehicle, or an unmanned maritime vehicle), semi-autonomously operated, remotely operated, or manually operated.

Further, the item dispensing vehicle 100 may not be movable. For instance, the item dispensing vehicle 100 may be temporarily or permanently stationary. A user may approach the item dispensing vehicle 100 and, upon a user authentication, items associated with the user may be dispensed thereto from the relevant bay(s) of the item dispensing vehicle 100.

Figure 2:
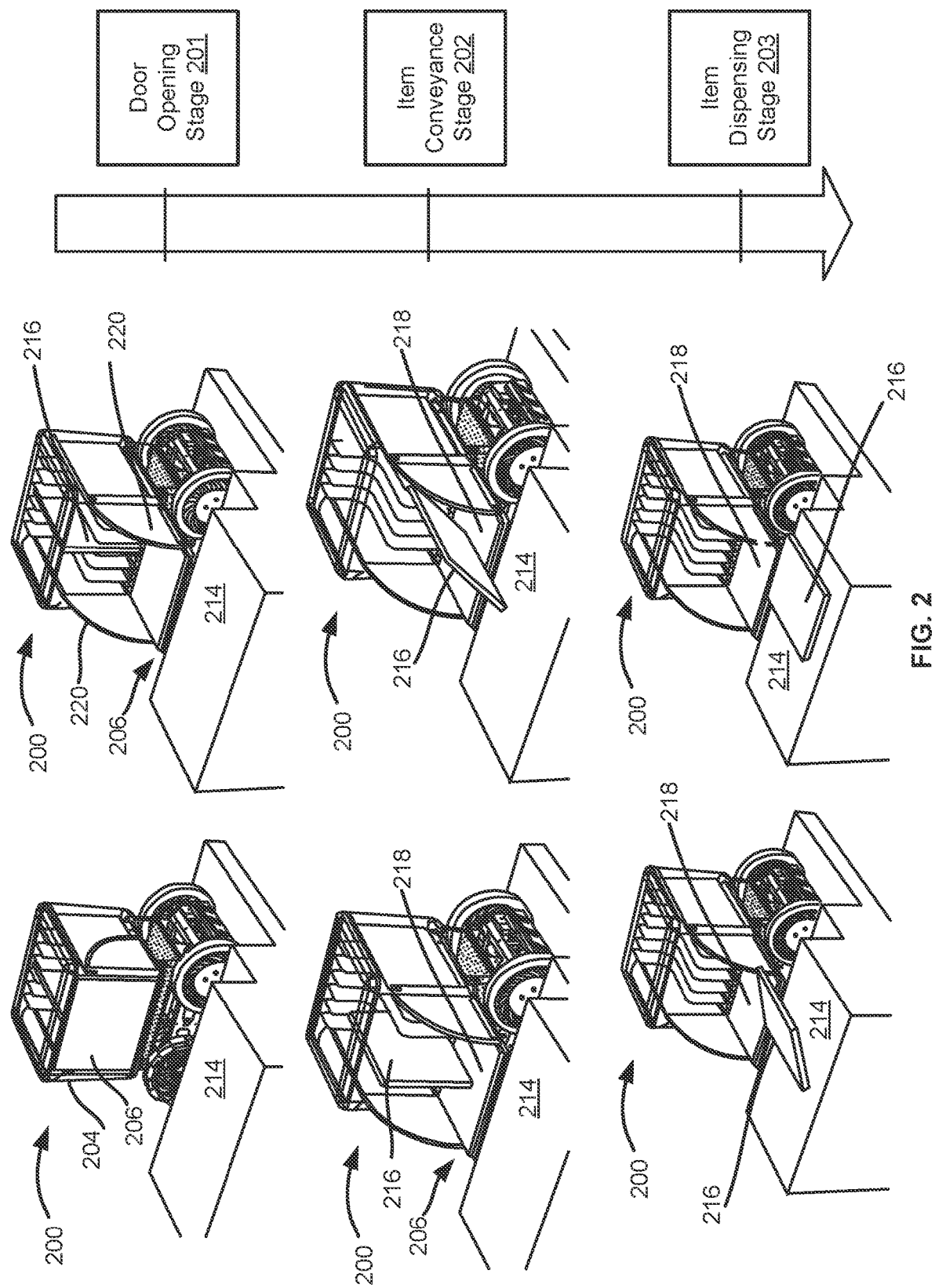
FIG. 2 illustrates an example of a flow diagram for dispensing items from selectively controllable bays of an item dispensing vehicle in accordance with at least one embodiment.

FIG. 2 illustrates an example of a flow diagram of stages for dispensing items from selectively controllable bays of an item dispensing vehicle 200 in accordance with at least one embodiment. The item dispensing vehicle 200 is an example of the item dispensing vehicle 100 in FIG. 1. The stages include a door opening stage 201, an item conveyance stage 202, and an item dispensing stage 203.

In an example, the door opening stage 201 involves the item dispensing vehicle 200 reaching a location 214 where an item 216 retained in the item dispensing vehicle 200 is to be dispensed outside of the item dispensing vehicle 200. For instance, the location 214 may be a delivery location associated with a residential address of a customer that purchased the item 216 for delivery. The item dispensing vehicle 200 can move to the location 214 with a door 206 of the item dispensing vehicle 200 in a closed position, where the door 206 blocks openings to bays within the item dispensing vehicle 200. Upon reaching the location 214, the item dispensing vehicle 200 can then cause the door 206 to move to an open position in which the openings are at least partially unblocked. The open position is illustrated as being a 900 angle with respect to a wall 204 of the item dispensing vehicle 200 (e.g., the openings are fully unblocked), but the open position may be any suitable angle for dispensing the item 216. For instance, the open position of the door 206 may be based on the location 214, on the item 216 that is to be dispensed at the location 214, or based on sensor data generated by a set of sensors (e.g., optical sensors) of the item dispensing vehicle 200. In an example, the door 206 may be open at an angle between 25° to 90°. For instance, opening the door 206 at 45° may increase reachability or allow the dispensing of an item at a location having a higher height than when the opening is 90°. The door 206 can include a conveyor belt 218 and a sidewall 220. In the open position, the conveyor belt 218 extends along a first plane and the sidewall 220 extends along a second plane that intersects with the first plane.

Although not shown in FIG. 2, the extendable portion of the item dispensing vehicle 200 can include the door 206 and a top wall (e.g., top wall 108 in FIG. 1) of the item dispensing vehicle 200 such that the conveyance surface can reach a greater distance. Each segment (e.g., the door 206, the top wall, etc.) can have its conveyor belts for moving the item 216. Alternatively, only the door 206 may include conveyor belt(s), while the top wall and other areas of the extendable portion have a sliding surface.

In the item conveyance stage 202, the item dispensing vehicle 200 determines which conveyer belt(s) are associated with a bay in the item dispensing vehicle 200 in which the item 216 is retained and causes the conveyor belt(s) to operate while other conveyor belts that are not associated with the bay remain unoperated. The item dispensing vehicle 200 can detect a trigger associated with dispensing the item 216. For instance, conveyor belt(s) may be pre-associated with locations and the trigger can be detection of the item dispensing vehicle 200 being at the location 214. Upon a location detection (e.g., via a Global Positioning System (GPS)), the item dispensing vehicle 200 can determine the conveyor belt(s) and/or the bay associated with the location 214 based on the pre-association. Or the item dispensing vehicle 200 may communicate with an online cloud service by sending location data and receiving conveyor belt identifier(s) (ID(s)), where the cloud service has the pre-programmed associations. Alternatively, the trigger may be a command received from a device associated with an operator that has information about the bays that are associated with locations. The command can include a bay identifier (ID), which the item dispensing vehicle 200 can determine is associated with a particular bay that includes a conveyor belt. The item dispensing vehicle 200 can then operate each conveyor belt associated with the bay to begin moving the item 216. Each conveyor belt can be associated with a set of clutches. To operate a conveyor belt, the item dispensing vehicle 200 causes the corresponding set of clutches to engage the conveyor belt (e.g., each clutch engaging a rolling wheel that is mechanically coupled with the conveyor belt). The item 216 moves from the bay to the door 206 via the operated conveyor belt(s).

During the item dispensing stage 203, the item dispensing vehicle 200 can cause the conveyor belt 218 associated with the door 206 to operate to dispense the item 216 at the location 214. Once the item 216 is dispensed at the location 214, the item dispensing vehicle 200 can return the door 206 to the closed position and travel to another location (e.g., another location associated with another item dispensing, a location for receiving another set of items, and/or a location for being loaded in a vehicle and returning to an item storage facility).

Figure 3:
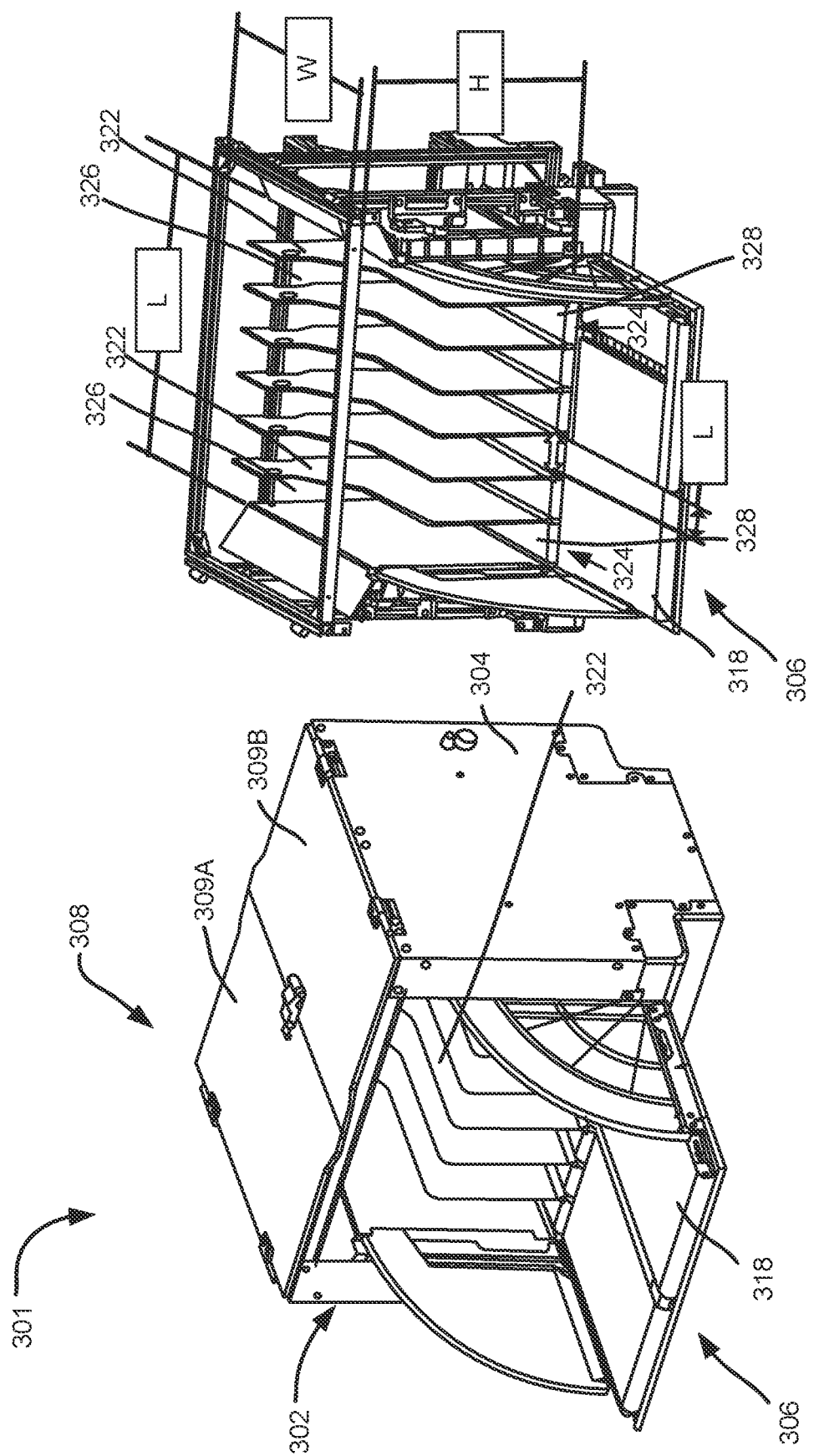
FIG. 3 illustrates an example of components of a housing of an item dispensing vehicle in accordance with at least one embodiment.

FIG. 3 illustrates an example of components of a housing 301 of an item dispensing vehicle (e.g., item dispensing vehicle 100 in FIG. 1) in accordance with at least one embodiment. The housing 301 is an example of the housing 101 in FIG. 1. The housing 301 includes a top wall 308 with panels 309A-B. The housing 301 also includes walls 302 and 304 and a door 306. In an example, the top wall 308 may be between 25 cm and 1 m in length and 25 cm and 1 m in width, but other dimensions are also possible. In addition, the walls 302 and 304 and the door 306 may be between 25 cm and 1 m in height, but other dimensions are also possible. The door 306 can include one or more conveyor belts 318 for dispensing items from within the housing 301 to the outside of housing 301.

In an example, the housing 301 includes bays 326, each having an opening 324 to the outside of the housing 301 and each including a set of conveyor belts 328 (a set of "one" is shown in FIG. 3, although the number of conveyor belts per bay can be more than one and can change over time). A conveyor belt can have a much smaller length than the housing 301, such as by being between 5 cm and 10 cm. The conveyor belt's width can be substantially similar to that of the housing 301 (e.g., smaller by a certain percentage to accommodate thicknesses of the walls). The set of conveyor belts 328 can define a bottom of a bay 306, whereas portions of the walls and/or dividers of the housing 301 can define the top and sides of the bay 306, such that the bay 306 has an interior volume exposed to the opening 324. Each bay 326 can be configured to retain one or more items in the interior volume and on the associated set of conveyor belts 328. The bays 326 may be separated from each other by dividers 322. That is, the dividers 322 may be positioned between the bays 326. The dividers 322 can extend from a top of the bays 326 proximal to the top wall 308 to the conveyor belts 328 positioned at a bottom of the housing 301. In an example, the bottom of a divider is positioned between two conveyor belts, where each of the two conveyor belts belongs to a different bay.

One or more of the dividers 322 may be removed based on an item size being too large and/or an item weight being too heavy to fit in a bay that includes a particular number of conveyor belts 328 (e.g., one conveyor belt). If a divider is removed, the previously separated bays can become a single bay in which an item can be retained and the associated conveyor belts 328 can be operated together to dispense this item. The housing 301 can selectively operate the conveyor belts 328 so that only the conveyor belts 328 associated with the item (or, equivalently, the particular bay) are operated with remaining conveyor belts remain unoperated. As such, if the bay 326 with an item includes two conveyor belts 328, the housing 301 can operate both of the conveyor belts 328 together to move the item to the door 306, where the conveyor belt 318 can continue moving the item to the location.

Figure 4:
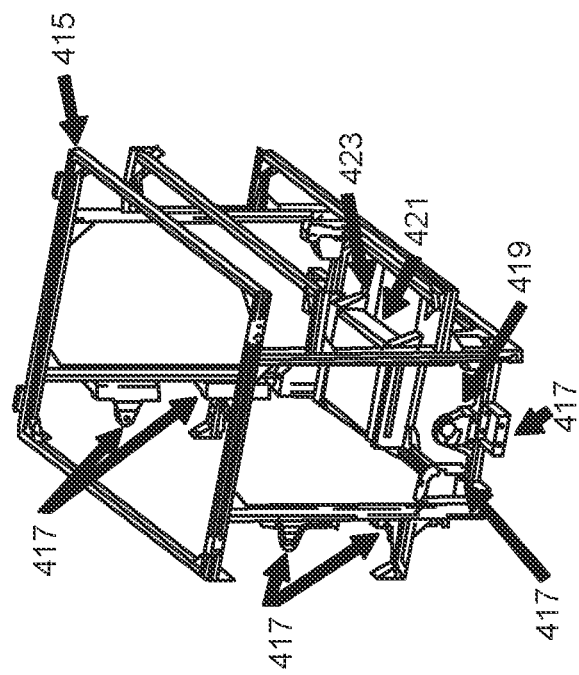
FIG. 4 illustrates an example of components of a frame assembly of a housing of an item dispensing vehicle in accordance with at least one embodiment.
Figure 4:
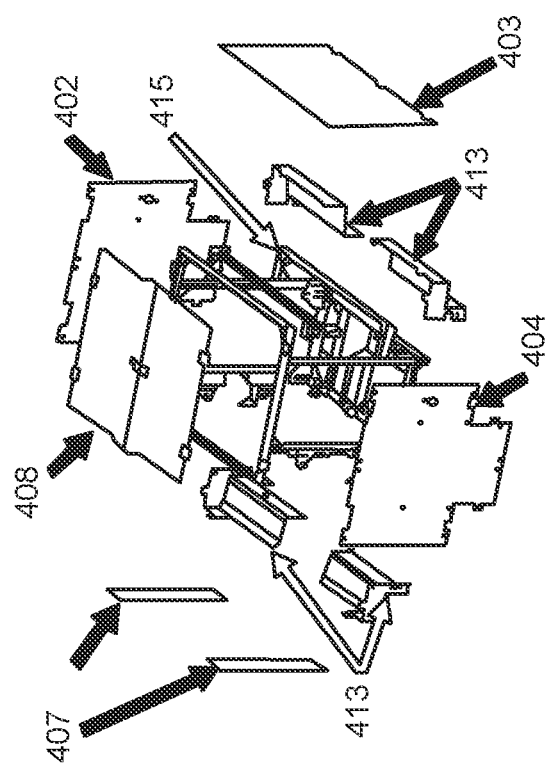

FIG. 4 illustrates an example of components of a frame assembly 415 of a housing (e.g., housing 101 in FIG. 1) of an item dispensing vehicle (e.g., item dispensing vehicle 100 in FIG. 1) in accordance with at least one embodiment. The frame assembly 415 forms a structure to which a top wall 408, side walls 402 and 404, and a rear wall 403 of the housing can be coupled. In addition, the frame assembly 415 includes door side panels 407 that can be positioned adjacent to a door (e.g., door 106 in FIG. 1) and corresponding side walls 402 and 404. The frame assembly 415 also includes wheel wells 413 in which wheels (e.g., wheels 412 in FIG. 1) can be mounted. Each of the walls 402 and 404, rear wall 403, door side panels 407, top wall 408, and wheel wells 413 can be coupled to the frame assembly 415 using extrusion rail t-nuts, or any other suitable fastener.

In an example, the frame assembly 415 also includes mounting brackets 417 for mounting to the walls 402 and 404 and the door. In addition, the frame assembly 415 includes a motor mount 419 to which a motor that drives conveyor belts and/or the door can be mounted. The mounting brackets 417 and the motor mount 419 can be three-dimensionally (3D) printed using multi jet fusion. Other electronics, such as one or more controllers for motor(s), power supplies, and so on can be stored in an electronic box 421 that is coupled to the frame assembly 415 by electronic box straps 423.

Figure 5:
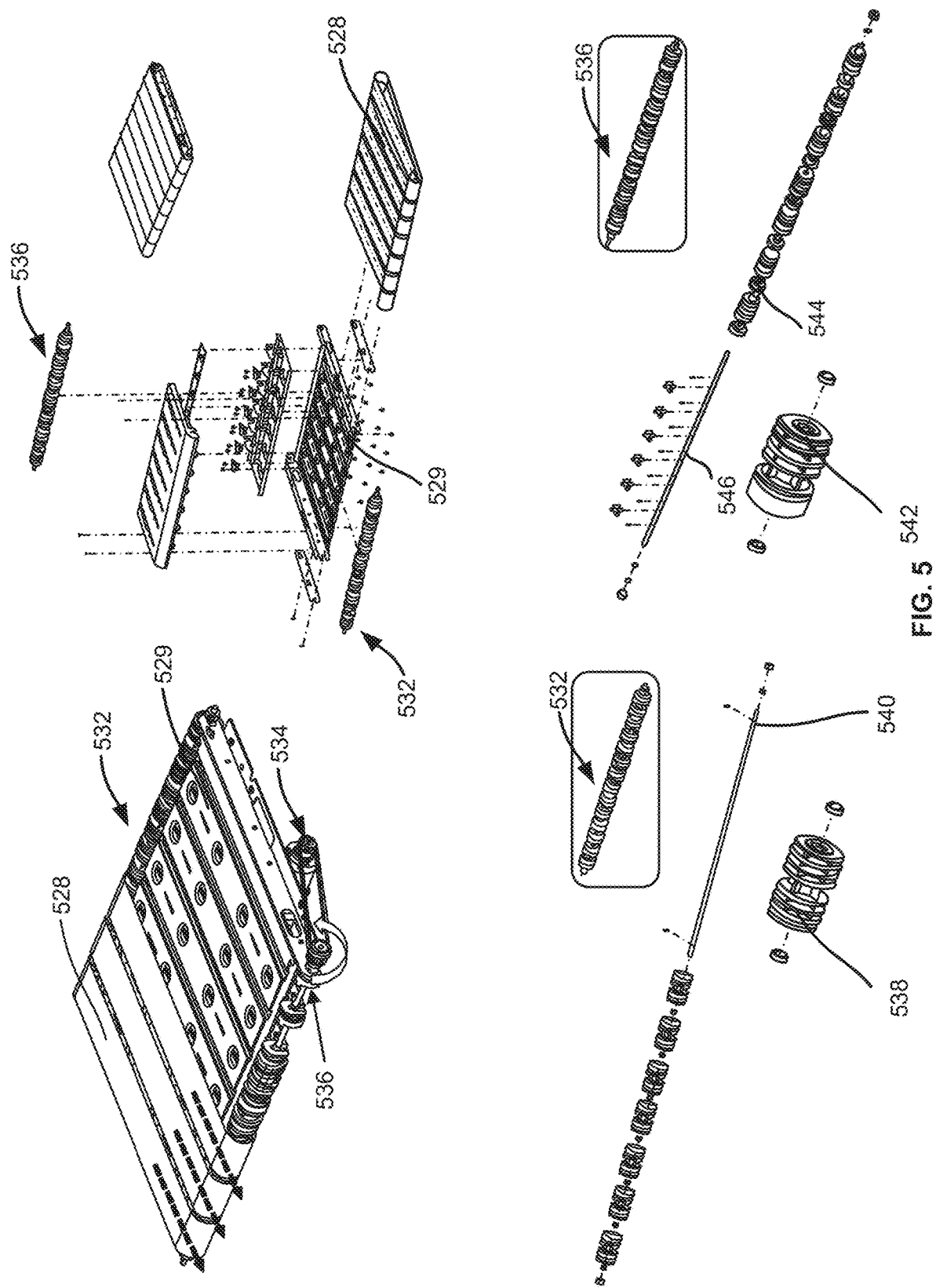
FIG. 5 illustrates an example of a conveyor mechanism with clutches for an item dispensing vehicle in accordance with at least one embodiment.

FIG. 5 illustrates an example of a conveyor mechanism with clutches for an item dispensing vehicle (e.g., item dispensing vehicle 100 in FIG. 1) in accordance with at least one embodiment. The conveyance mechanism includes conveyor belts 528 that are positioned around a frame support 529. The conveyor belts 528 may be elastic belts, plastic segmented belts, chain belts, etc. At one end of the frame support 529 there is an idler assembly 532 that is coupled with the conveyor belts 528. The idler assembly 532 includes rolling wheels 538 and an idler shaft 540 around which the rolling wheels 538 are positioned. At the other end of the frame support 529 there is a driving assembly 536 that that can selectively engage the conveyor belts 528. The driving assembly 536 includes rolling wheels 542 and clutches 544 positioned around and coupled to a driving shaft 546. The driving shaft 546 is closer to openings (e.g., openings 324 in FIG. 3) of bays (e.g., bays 326 in FIG. 3) of the item dispensing vehicle. The driving shaft 546 is mechanically coupled to a motor 534 (e.g., via a belt and gears). Each conveyor belt 528 can be in contact with a rolling wheel 542. Each rolling wheel 542 can interface with a clutch 544. A clutch 544 can be controlled to become mechanically coupled with the interfacing rolling wheel 542. For instance, the clutch 544 can be an electro-mechanical or electro-magnetic clutch that includes protrusions and/or recesses that, upon an activation of the clutch 544, mechanically engage with corresponding recesses/protrusions of the interfacing rolling wheel 542. As such, when the clutch 544 is activated, the conveyor belt 528 is engaged with the driving shaft 546 via the rolling wheel 542 and the clutch 544. Because the driving shaft 546 is mechanically coupled with the motor 534, when the motor 546 is operated, the conveyor belt 528 is also operated via its mechanical coupling with the driving shaft 546. Other clutches 544 associated with other conveyor belts 528 may not be activated so that to free-spin and, thus, the other conveyor belts 528 are not operated simultaneously. One or more clutches 544, and therefore one or more conveyor belts 528, may be selectively activated in a simultaneous manner, for instance if a bay includes the one or more conveyor belts 528 for dispensing an item.

Figure 6:
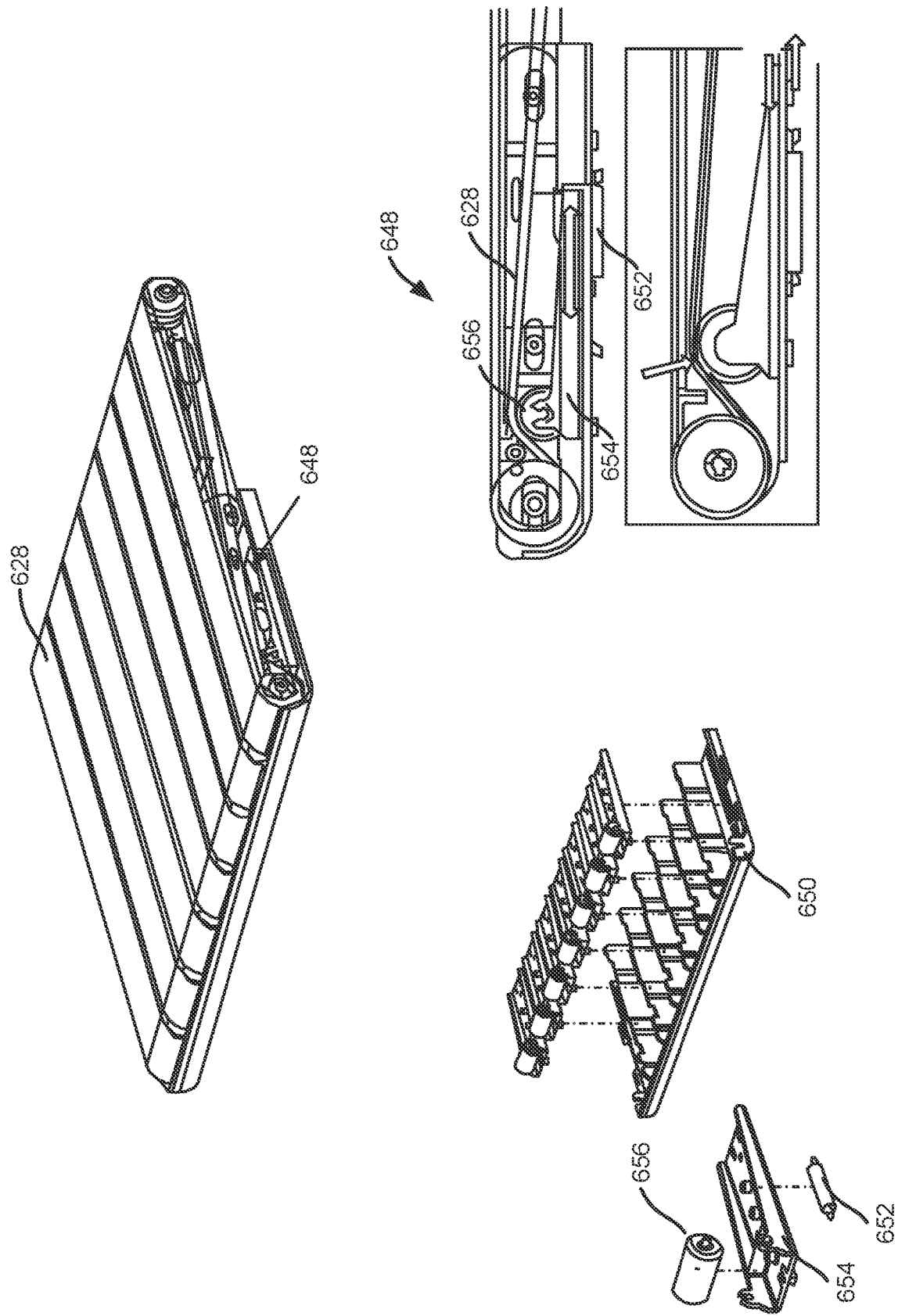
FIG. 6 illustrates a spring loaded tensioner of an item dispensing vehicle in accordance with at least one embodiment.

FIG. 6 illustrates a spring loaded tensioner 648 of an item dispensing vehicle (e.g., item dispensing vehicle 100 in FIG. 1) in accordance with at least one embodiment. The spring loaded tensioner 648 is coupled to a conveyor belt 628 and is mounted on a mounting structure 650, This structure 650 can be divided into multiple compartments, each corresponding to a conveyor belt and configured to receive and retain a spring loaded tensioner. The spring loaded tension 648 includes a spring 652, a base 654, and a rolling wheel 656. The base 654 can slide between positions in a first direction (indicated by the double-sided arrow) parallel to the conveyor belt 628 based on the spring 652. The rolling wheel 656 can tension the conveyor belt 628 in a second direction based on a position of the base 654. An angle and force of a belt reaction force ($F_p$) is counter by friction ($F_f$) and a spring force ($F_K$) of the spring 652 to apply the tension. Tensioning the conveyor belt 628 using the spring loaded tensioner 648 can allow for the conveyor belt 628 to be driven backwards. Additional spring loaded tensioners may be positioned at different locations along the conveyor belt 628 to provide additional tensioning.

Although the illustrated tensioning mechanism relies on a spring, other tensioning mechanisms are possible. For instance, electro-mechanical tensioning with controllable actuators are possible. In addition, the tensioning mechanism may not be needed in some cases. For instance, if the conveyor belt 628 is elastic and has an internal surface (e.g., coated with Teflon) with a lower surface friction than an external surface, the tensioning mechanism may not be necessary.

Figure 7:
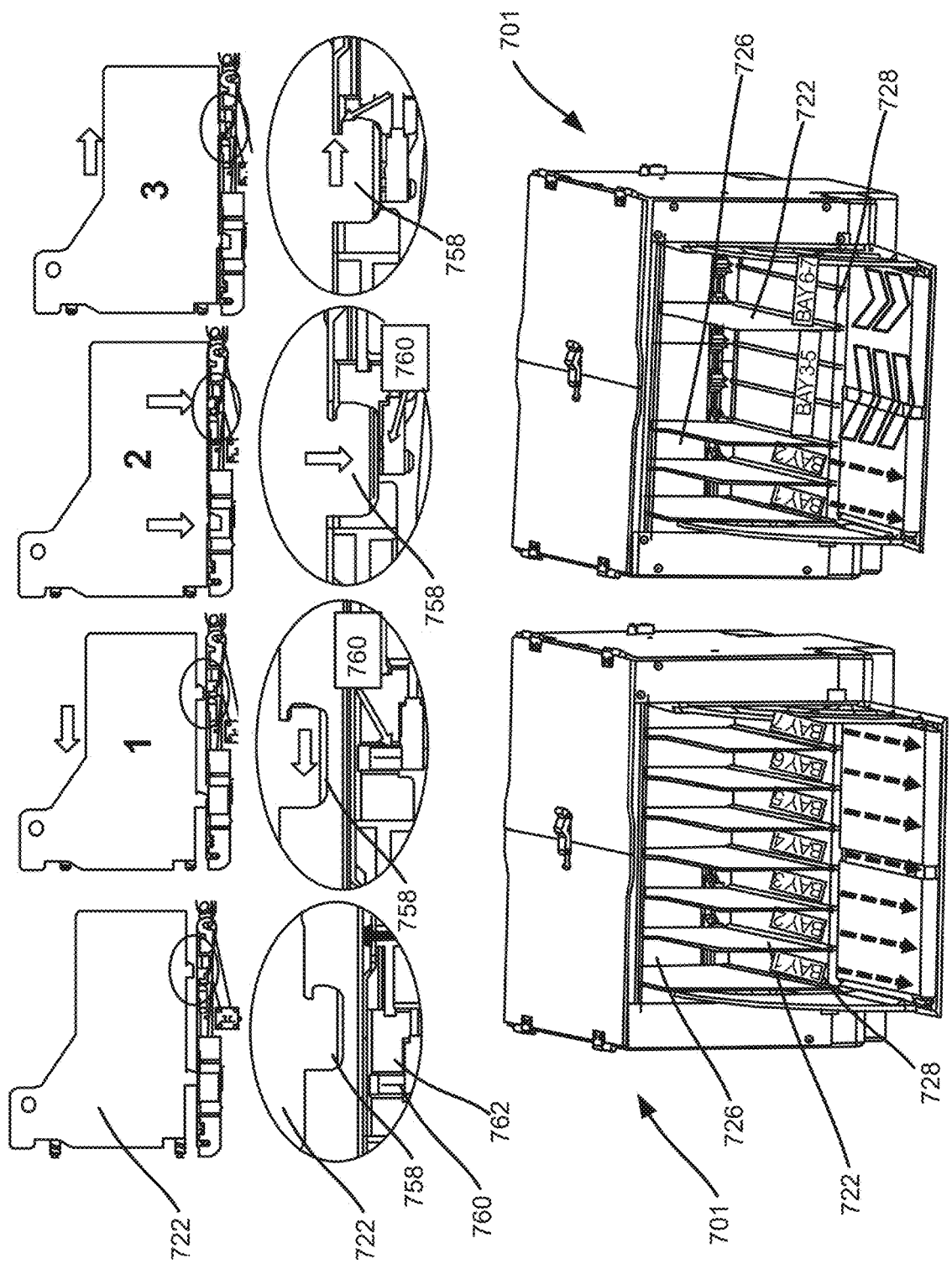
FIG. 7 illustrates detection of divider presence in an item dispensing vehicle in accordance with at least one embodiment.

FIG. 7 illustrates detection of divider presence in an item dispensing vehicle (e.g., item dispensing vehicle 100 in FIG. 1) in accordance with at least one embodiment. In an example, a space may exist between two adjacent conveyor belts, where the space can be used to receive at least a portion of a divider (e.g., a bottom portion). Presence of the divider in the space indicates that the two conveyor belts belong to different bays. Absence of the divider in the space indicates that the two conveyor belt belong to the same bay. Presence and absence can be detected by using a sensor. The sensor can be installed in the space. This sensor can be optical sensor, although other types of sensors are possible (e.g., an electrical resistor sensor, a weight sensor, etc.). Non-sensor based techniques can also be used to indicate the presence or absence. For instance, manual input can be received at a user interface of the item dispensing vehicle or at a remote device with which the item dispensing vehicle is communicatively coupled, where this manual input can indicate the presence or absence and/or the grouping of conveyor belts to bays.

In the illustration of FIG. 7, the item dispensing vehicle can include a sensor 760 positioned in a recess 762, which may be part of a base support (e.g., the mounting structure 650 in FIG. 6). The sensor 760 may be an optical or other sensor that can detect a presence or absence of a divider 722. For instance, the divider 722 can include a protrusion 758 that can be positioned within the recess 762. With the protrusion 758 positioned in the recess 762, the sensor 760 determines the divider 722 is present. When the protrusion 758 is not positioned in the recess 762, the sensor 760 determines the divider 722 is absent. Sensor data is generated by the sensor 760 and output to a computer system to indicate the presence or absence.

In an example, as illustrated in the bottom-left image, there may be dividers 722 between each bay 726 in a housing 701. There can be a sensor 760 associated with each bay 726. So, each of the sensors 760 can detect the presence of the dividers 722. If an item is loaded in any of the bays 726 and is to be dispensed, the item dispensing vehicle can operate a conveyor belt 728 that is associated with the bay 726 while other conveyor belts that are associated with other bays remain unoperated.

As illustrated in the bottom-right image, there may not be dividers 722 between each bay 726 in the housing 701. One or more dividers 722 may be absent so that items larger than a size of one bay can be loaded into the housing 701. The sensors 760 associated with the bays 726 that include dividers 722 can detect the presence of the dividers 722 and the sensors 760 associated with the bays 726 that do not include dividers 722 can detect the absence of the dividers 722. If one or more items are loaded into adjacent bays 726 between which there is no divider 722, the conveyor belts 728 associated with the loaded bays 726 can be operated together while other conveyor belts 728 associated with other bays 726 remain unoperated. Operating the conveyor belts 728 can involve identifying one or more clutches (e.g., clutch 544 in FIG. 5) that are associated with the conveyor belts 728 of the loaded bays 726 and causing the one or more clutches to engage the conveyor belts 728.

Conveyor belts 728 may be pre-associated with a bay 726 or a bay ID. For instance, a first conveyor belt can be pre-associated with a first bay. Upon determining that no divider is present between the first conveyor belt and an adjacent conveyor belt, the item dispensing vehicle can identify that the first conveyor belt and the adjacent conveyor belt belong to the first bay. An indication may be sent to a remote device that the first conveyor belt and the adjacent conveyor belt belong to the first bay, and the item dispensing vehicle can then receive a command to operate the first bay. The indication of the set of conveyor belts can be presented at a graphical user interface (GUI) of the remote device.

Figure 8:
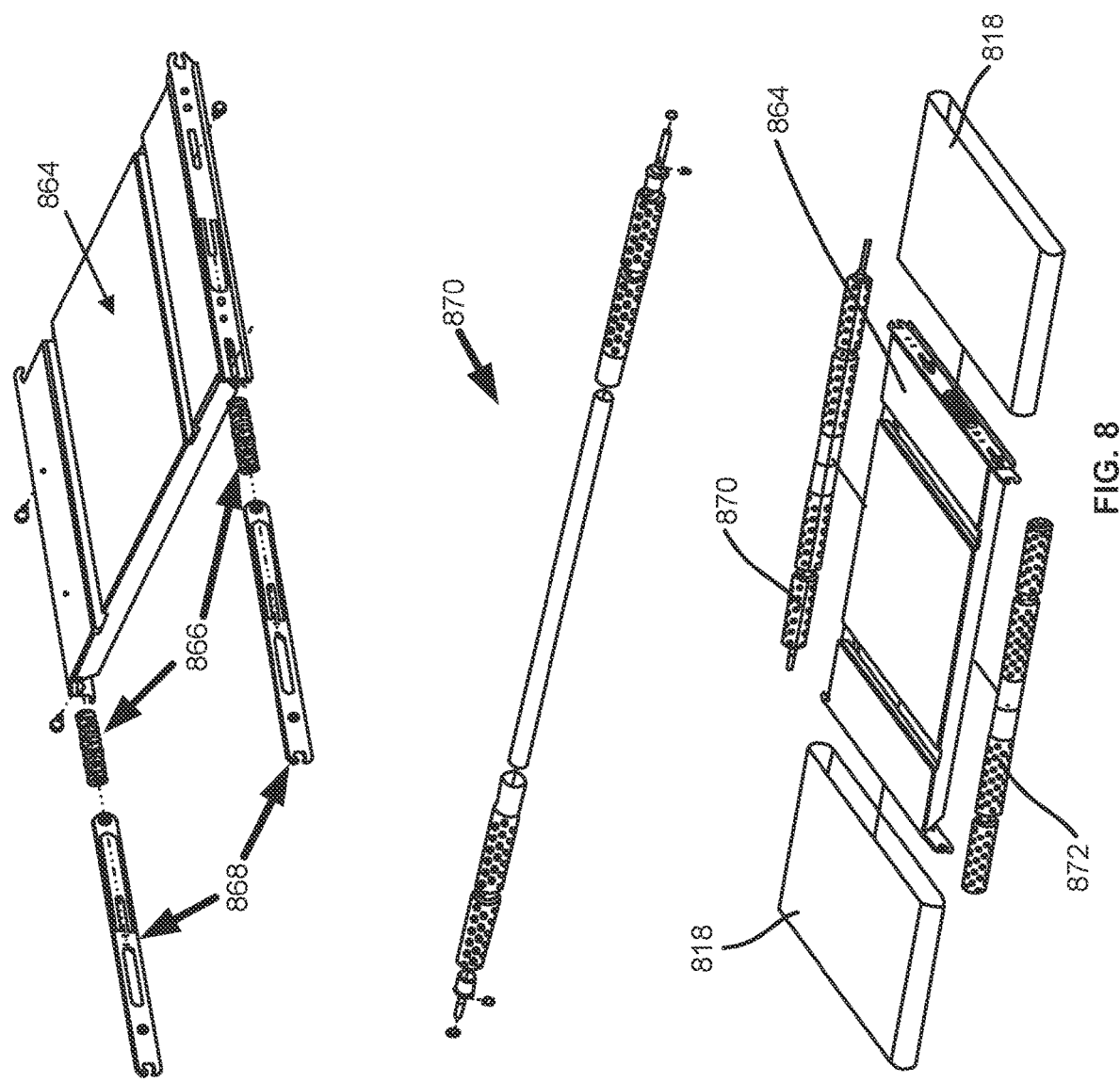
FIG. 8 illustrates an example of components of a door of an item dispensing vehicle in accordance with at least one embodiment.

FIG. 8 illustrates an example of components of a door (e.g., door 106 in FIG. 1) of an item dispensing vehicle (e.g., item dispensing vehicle 100 in FIG. 1) in accordance with at least one embodiment. The door can include a spine frame 864 with slides 868 on either side of the spine frame 864. The spine frame 864 can provide support for conveyor belts 818 that are coupled to the spine frame 864. Each of the slides 868 can be coupled to a compression spring 866 that can be retracted to allow conveyor belts 818 to be installed. Once the conveyor belts 818 are installed, the compression springs 866 can be released to provide tension to the conveyor belts 818.

The door can also include a driving shaft 870 coupled to the conveyor belts 818 for driving the conveyor belts 818. The driving shaft 870 can be positioned closer to bays (e.g., bays 326 in FIG. 3) than an idler shaft 872 that is also coupled to the conveyor belts 818. The driving shaft 870 and the idler shaft 872 provide a rolling surface for the conveyor belts 818. The idler shaft 872 can be coupled to the slides 868. Both the driving shaft 870 and the idler shaft 872 have interchangeable rollers that can be swapped out to for various door belt configurations.

Figure 9:
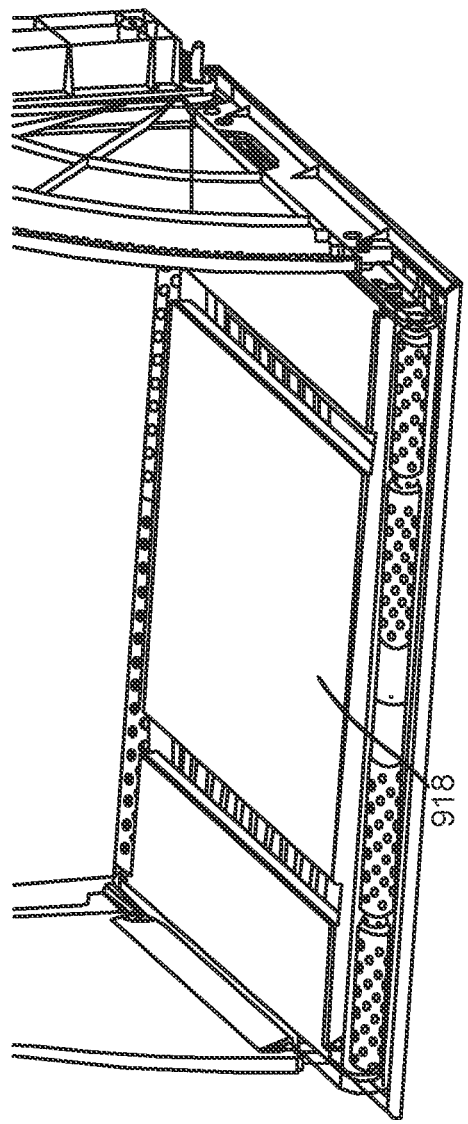
FIG. 9 illustrates example conveyor belts of a door of an item dispensing vehicle in accordance with at least one embodiment.
Figure 9:
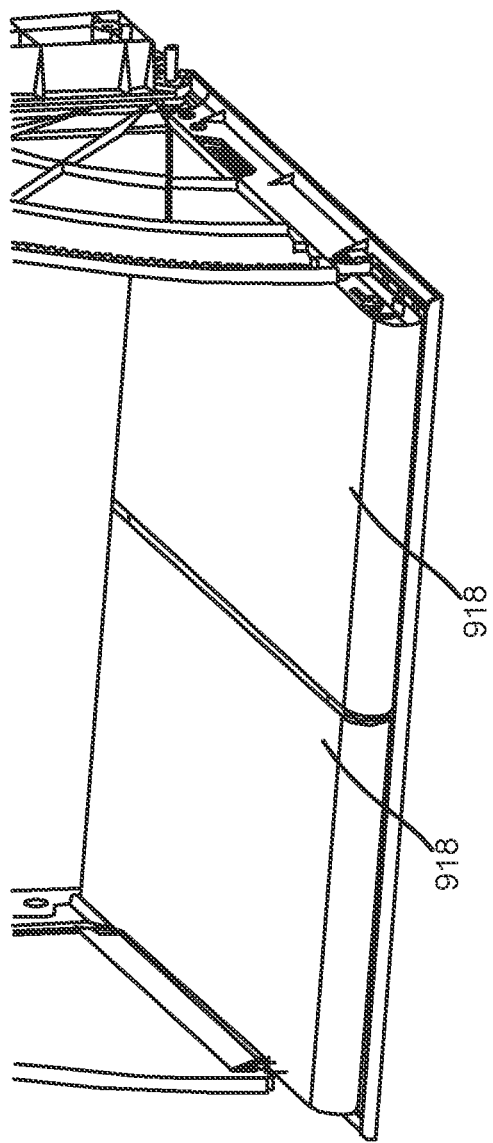

While the door is illustrated as having two conveyor belts 818 in FIG. 8, the door may alternatively have a single conveyor or more than two conveyor belts in other configurations. For instance, FIG. 9 illustrates a configuration with a single conveyor belt and a dual conveyor belt. If more than one conveyor belt is included, when the door is an open position, the different conveyor belts can be operated simultaneously. Optionally, a subset of the conveyor belts can be selectively operated. Each conveyor belt can have a separate drive shaft. Or, the conveyor belts may have one common driving shaft with controllable clutches that can be selectively engaged. The selection of a conveyor belt can depend on the bay from which an item is dispensed. In particular, the operated conveyor belt is positioned in front of the bay. Such information about door conveyor belt-to-bay positioning can be predefined and can be updated when a bay configuration changes (e.g., when the bay's size is increased or decreased depending on the presence or absence of a divider).

Figure 10:
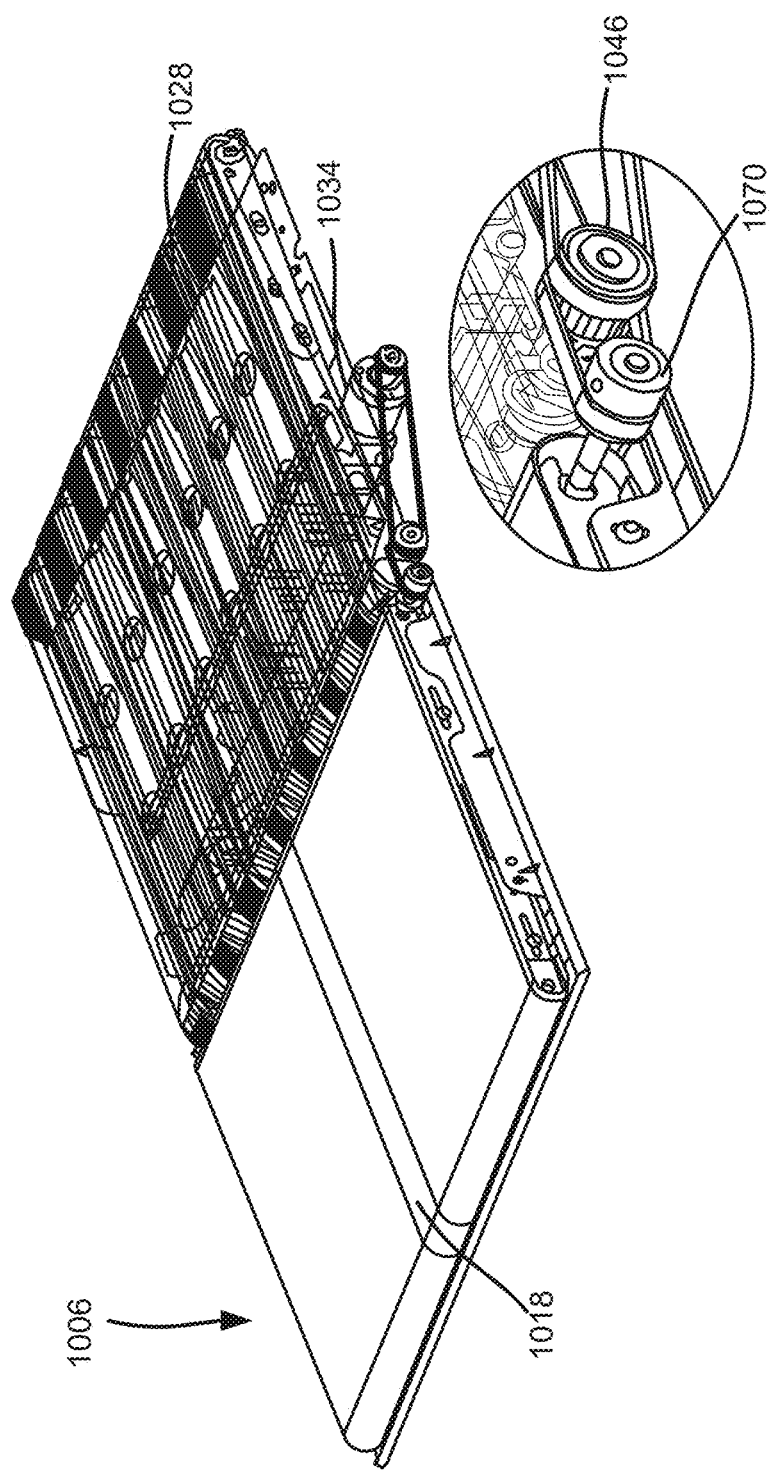
FIG. 10 illustrates a coupling between a motor and driving shafts of an item dispensing vehicle in accordance with at least one embodiment.

FIG. 10 illustrates a coupling between a motor 1034 and driving shafts of an item dispensing vehicle (e.g., item dispensing vehicle 100 in FIG. 1) in accordance with at least one embodiment. The motor 1034 can be mechanically coupled to a driving shaft 1046 that is selectively coupled to one or more conveyor belts 1028 via a set of clutches (e.g., clutches 544 in FIG. 5), where these conveyor belts 1028 belong to bays. In addition, the motor 1034 can be mechanically coupled to a driving shaft 1070 in a door 1006, where the driving shaft 1070 is coupled with a conveyor belt 1018 of the door 1006. The mechanical coupling can use a set of gears attached to the different shafts 1046 and 1070 and the motor 1034 and a set of belts that rolled around the gears. So, the motor 1034 can operate both the driving shaft 1046 and the driving shaft 1070. As such, when one or more of the conveyor belts 1028 are operated, the conveyor belt 1018 is also operated. In some examples, the conveyor belt 1018 may be operated after the door 1006 has been moved to an open position.

Figure 11:
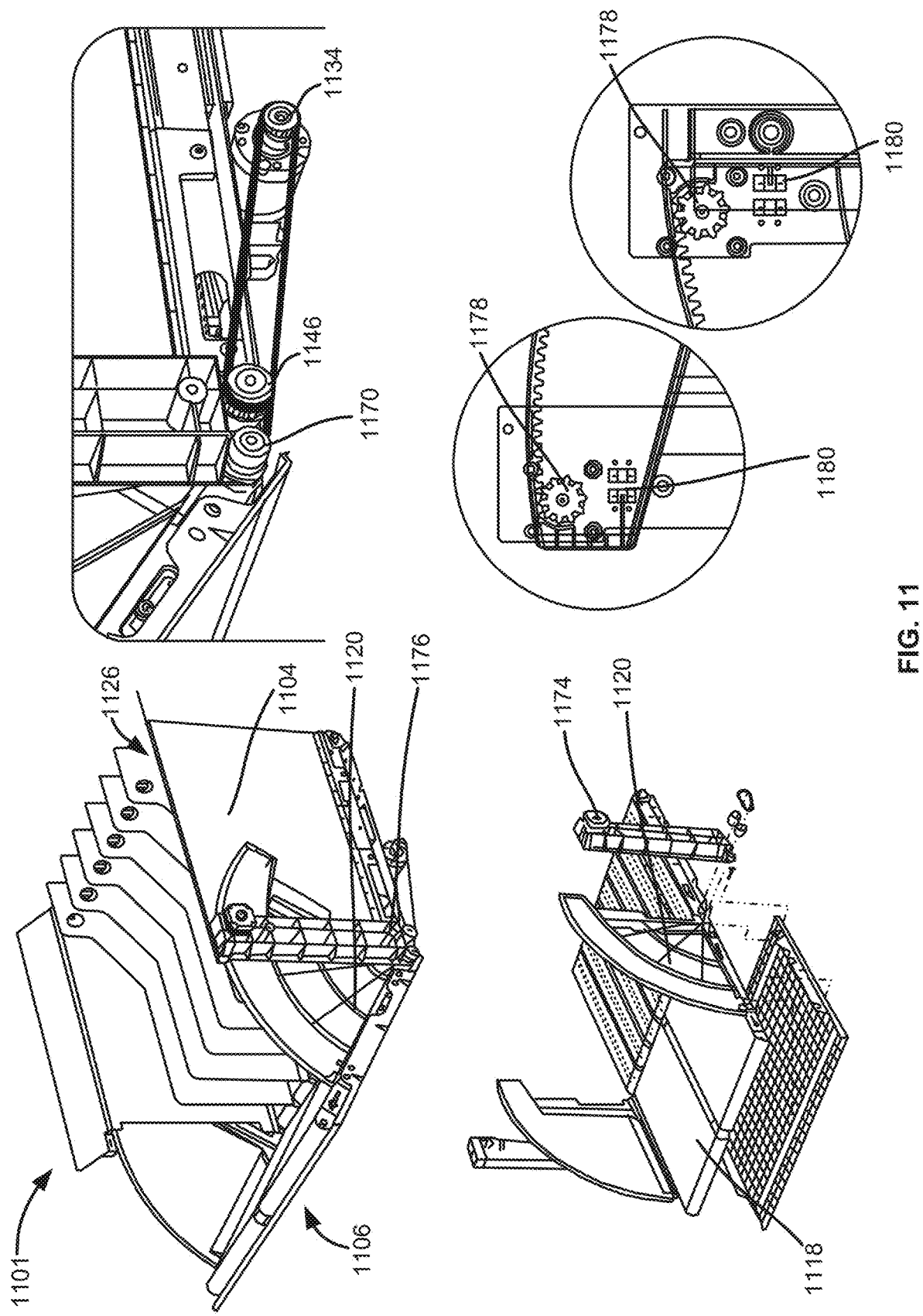
FIG. 11 illustrates an example of components for opening and closing a door of an item dispensing vehicle in accordance with at least one embodiment.

FIG. 11 illustrates an example of components for opening and closing a door 1106 of an item dispensing vehicle (e.g., item dispensing vehicle 100 in FIG. 1) in accordance with at least one embodiment. A housing 1101 of the item dispensing vehicle can include the door 1106, which includes sidewalls 1120. A motor 1174 for controlling opening and closing of the door 1106 can be positioned on a wall 1104 that defines at least a portion of a bay 1126 in the housing 1101. The housing 1101 is illustrated as having two sidewalls 1120, so the housing 1101 may include two motors 1174, one for each sidewall 1120. The motors 1174 may be stepper motors, servo motors, direct current (DC) motors, etc. for opening the door 1106. For instance, the sidewall 1120 can include a gear 1178 that is mechanically coupled with the motor 1174. As such, the sidewall 1120 may be a pinion and the gear 1178 can be a rack that engages with the pinion to move the sidewall 1120 based on the motor 1174. The motors 1174 may be synchronized so that the opening and closing of the sidewalls 1120 is in synch.

In an example, the housing 1101 can also include a set of sensors 1180 to detect a position of the door 1106. In the case of using an optical sensor as part of this set, the sidewall 1120 can include protrusions and recesses (e.g., of the pinion), that the optical can detect to generate sensor data indicating the position of the door 1106. So, first sensor data generated by the optical sensor based on a detection of a protrusion or recess can correspond to a closed position of the door 1106, whereas second sensor data generated by the optical based on a detection of another protrusion or recess can correspond to an open position of the door 1106, where this open position is at a particular angle that corresponds to the angle of the protrusion or recess. The door 1106 may be operable to multiple open positions by the motor 1174 (e.g., stopped at different targetable angle), and the multiple open positions may similarly be detectable by the optical sensor. Additionally or alternatively, the set of sensors 1180 can include a sensor installed on the outside or outside of the door 1106 (e.g., an optical sensor, an acceleration sensor, etc.) to detect the closed position and an open position (and, optionally, the angle of the open position). Additionally or alternatively, the item dispensing vehicle may include a set of optical sensors (e.g., cameras) to generate images of the door and the surrounding environment and may implement image processing to determine the closed position, an open position (and, optionally the angle of the open position), and/or a target angle at which the open position of the door 1106 should be set to achieve a particular height or reachability depending on a height or other configuration of a dispensing location. Non-sensor detection of door's 1106 position may be possible. For instance, depending on the load of the motor 1174 (e.g., the amount of electrical current flowing through the motor), the motor 1174 could be detected to be in an open or closed position. Additionally or alternatively, a motor controller can detect the number and direction of rotations of the motor 1174 and can correlate the number and direction to the position 1174 of the door based on the gear ratio.

Although not shown in FIG. 11, the sidewall 1120 may include a retractable push device. When the door 1106 is in the closed position, the retractable push device may be in a retracted position, and when the door 1106 is in the open position, the retractable push device can be in an extended position over at least a portion of a conveyor belt 1118 of the door 1106. The retractable push device can be spring loaded with a wedge or chamfered geometry that enables the retraction when the door 1006 is in the closed position and the extension otherwise. For instance, the wedge can contact the wall 1104 as the door 1106 is being closed causing the retraction. When the door 1106 is opening, the spring can cause the extension. Other retraction-extension mechanisms are also possible including electrically and/or magnetically operated actuator. The retractable push device can ensure that items remain on the conveyor belt 1118 for an entirety of the conveyor belt 1118 and does not fall off the conveyor belt 1118 prior to reaching an end of the conveyor belt 1118. In particular, as an item is moved out of a bay, the item may contact the retractable push device that then causes the item to, for instance, tilt towards the center of conveyor belt 1118.

Figure 12:
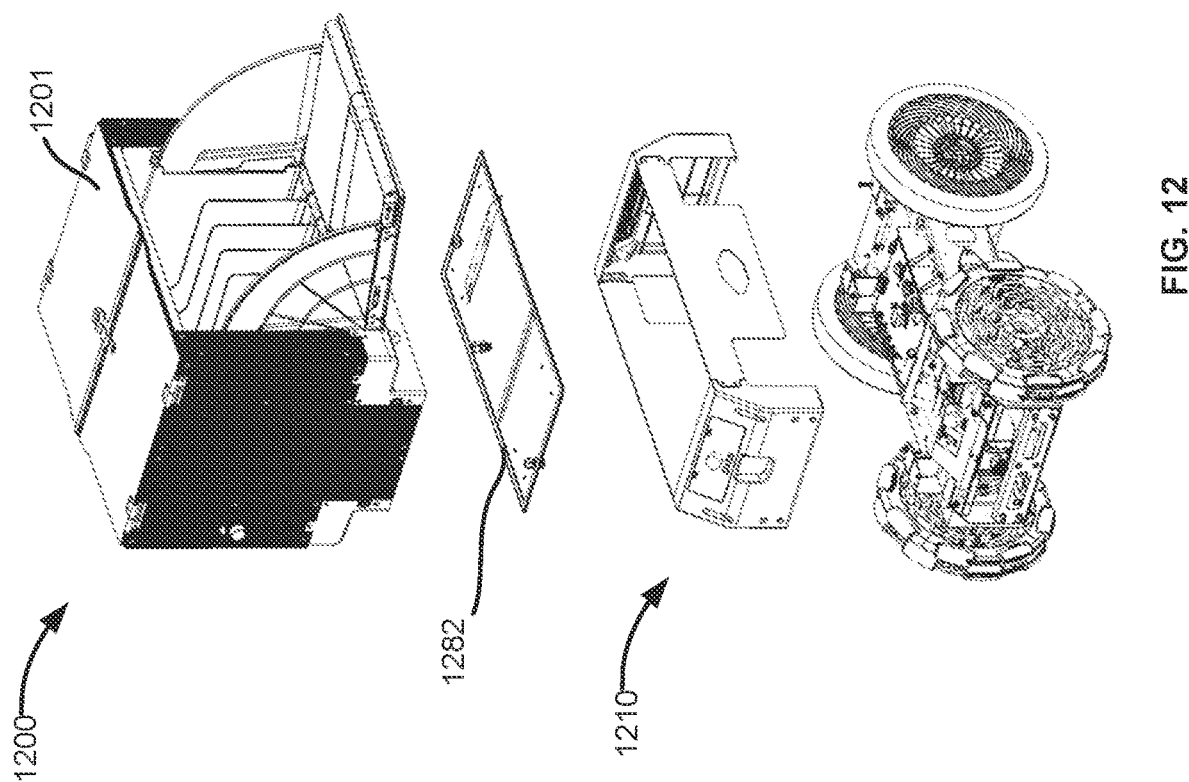
FIG. 12 illustrates an example of an item dispensing vehicle with a water-resistant flooring in accordance with at least one embodiment.

FIG. 12 illustrates an example of an item dispensing vehicle 1200 with a water-resistant flooring 1282 in accordance with at least one embodiment. The item dispensing vehicle 1200 includes a housing 1201 and a movable base 1210. The housing 1201 is an example of the housing 101 in FIG. 1 and the movable base 1210 is an example of the movable base 110 in FIG. 1. In an example, the item dispensing vehicle 1200 can also include the water-resistant flooring 1282 between the housing 1201 and the movable base 1210. The water-resistant flooring 1282 can prevent water or other liquid from entering the movable base 1210 where electronics of the item dispensing vehicle 1200 are located. The water-resistant flooring 1282 may be made from polycarbonate, polypropylene, acrylic, or any other suitable lightweight and water-resistant material. The water-resistant flooring 1282 may be, but need not be, rigid to provide structure between the housing 1201 and the movable base 1210.

Figure 13:
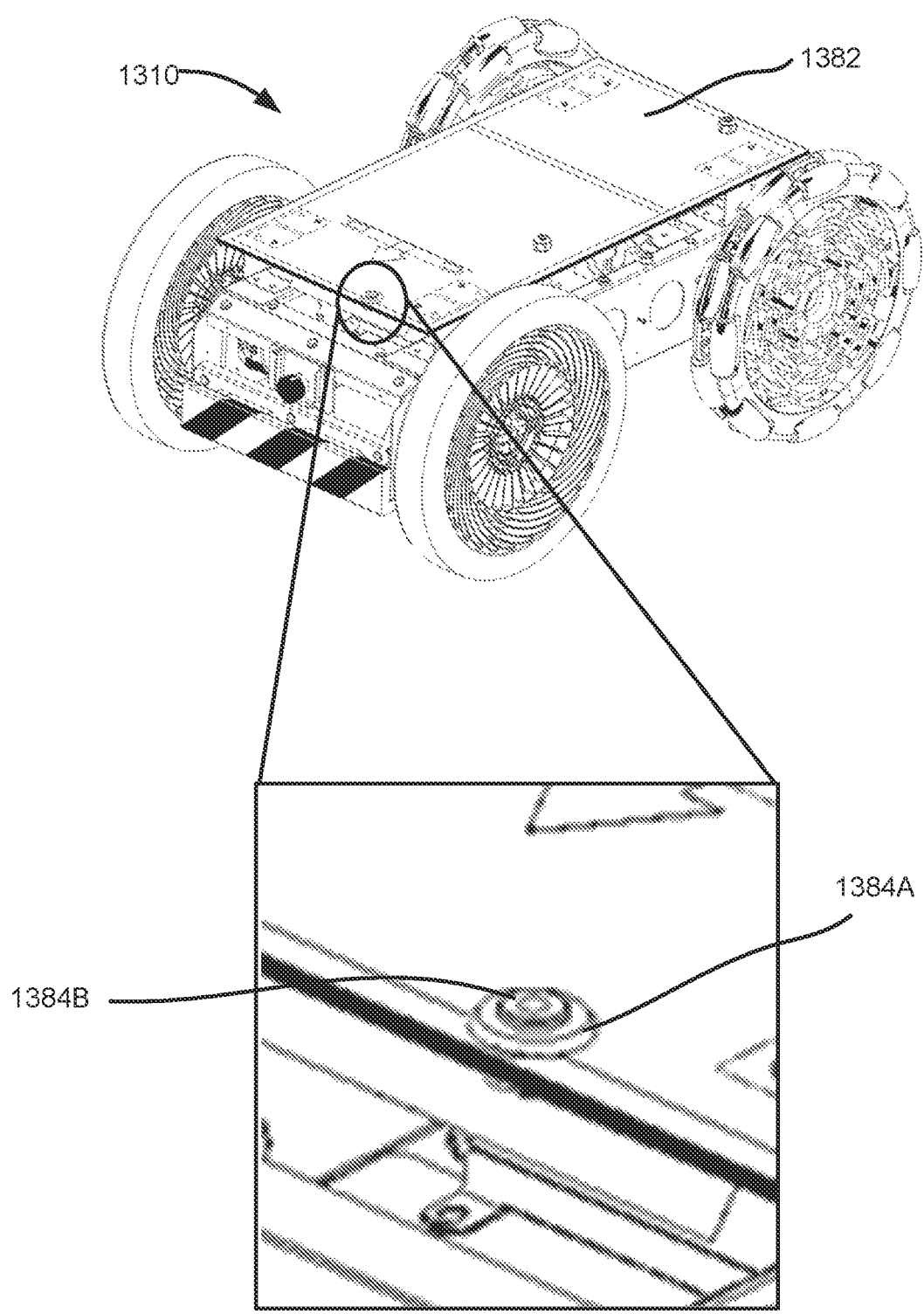
FIG. 13 illustrates an example of grommets for a water-resistant flooring of an item dispensing vehicle in accordance with at least one embodiment.

FIG. 13 illustrates an example of grommets 1384A-B for a water-resistant flooring 1382 of an item dispensing vehicle 1300 in accordance with at least one embodiment. The water-resistant flooring 1382 can include openings through which cables extend between electronics positioned in the movable base 1310 to components in a housing (e.g., housing 1201 in FIG. 12) positioned over the movable base 1310. To prevent water from leaking into the movable base 1310 through the openings, the grommets 1384A-B can provide seals. For instance, grommet 1384A be inserted into an opening and a cable can be inserted through the grommet 1384A. An inner hole of the grommet 1384A can be larger than a diameter of the cable. So, grommet 1384B can be inserted into the inner hole of grommet 1384A and around the cable to provide a seal around the cable. In addition, the grommet 1384B increases a height at which a water level would need to be for any water to leak from above the water-resistant flooring 1382 into the movable base 1310 through the openings.

Figure 14:
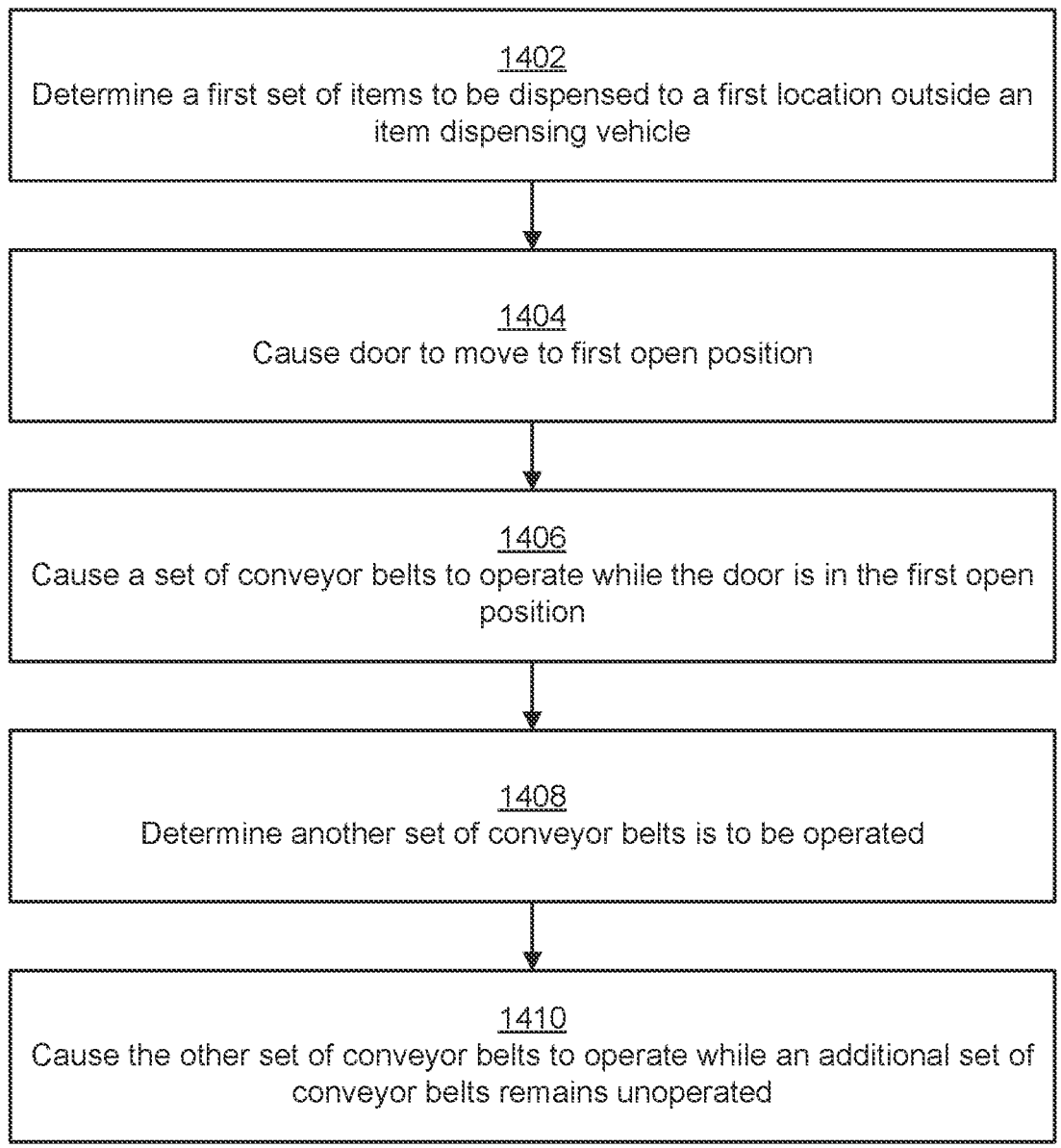
FIG. 14 illustrates an example flow for a process of selectively operating conveyor belts of an item dispensing vehicle in accordance with at least on embodiments.

FIG. 14 illustrates an example flow for a process of selectively operating conveyor belts of an item dispensing vehicle (e.g., item dispensing vehicle 100 in FIG. 1) in accordance with at least on embodiments. The process may be performed by one or more components of the item dispensing vehicle. Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 1402, where the item dispensing vehicle determines a first set of items to be dispensed to a first location outside the item dispensing vehicle. The item dispensing vehicle may include a movable base with a plurality of wheels and an item dispensing housing that is mounted to the movable base. The item dispensing housing can retain and dispense items and includes a first bay for retaining a first set of items on a first set of conveyor belts that ends at a first opening, a second bay for retaining a second set of items on a second set of conveyor belts that ends at a second opening, a divider positioned between the first bay and the second bay, and a door that includes a third set of conveyor belts. The door is operable between one or more open positions and a closed position, where the door blocks the first opening and the second opening in the closed position. The first opening and the second opening can be at least partially unblocked in a first open position of the one or more open positions. The first location may be an address of a customer that ordered the first set of items.

In an example, the flow includes operation 1404, where the item dispensing vehicle causes the door to move to the first open position. A motor installed in a wall of the first bay can be coupled to a gear in a sidewall of the door. Operation of the motor causes the door to be moved to the first open position, where a sensor can detect the position of the door. The open position can be targeted to a particular angle, where this angle can be pre-stored by the item dispensing vehicle in association with a dispensing location, can be received from a remote device operated by the operator of the item dispensing vehicle, or can be computed by the item dispensing vehicle on-the-fly based on image (or other sensor) processing of the dispensing location. Different triggers are possible to start the item dispensing operation by opening the door. In one example, a command is received from a remote device or via a user interface of the item dispensing vehicle. This command can indicate a request to dispense the first set of items and/or to operate the first bay. In another example, upon arriving to a first dispensing location, the item dispensing vehicle can detect and compare this location to location information stored locally by the item dispensing vehicle and/or retrievable by the item dispensing vehicle from a remote computer system. The location information can associate bays (e.g., bay IDs) with dispensing locations. The item dispensing vehicle can determine a match between the first dispensing location and a second dispensing location indicated by the location information. Based on the match, the item dispensing vehicle can determine that the item dispensing operation is to start and can determine the bay identifier associated, by the location information, with the second dispensing location. In yet another example, the item dispensing vehicle can send location information about the first dispensing location or its own location to the remote computer system that then performs the matching process and sends a command to the item dispensing vehicle to start the item dispensing operation upon the determination of a location match.

In an example, the flow includes operation 1406, where the item dispensing vehicle causes a set of conveyor belts to operate while the door is in the first open position. The set of conveyor belts can be the third set of conveyor belts included in the door. A motor can be coupled to a driving shaft of the door. The motor can be operated, thereby causing the third set of conveyor belts to operate.

In an example, the flow includes operation 1408, where the item dispensing vehicle determines another set of conveyor belts is to be operated. The other set of conveyor belts can be the first set of conveyor belts of the first bay. Different techniques are possible to identify the set of conveyors to operate. In one example, a command (e.g., the same command as in operation 1204) is received from the remote device, the user interface, or the remote computer system, where the command includes a bay identifier of the first bay. The bay identifier can be pre-associated by default with a first conveyor belt that belongs to the first bay. In this case, presence detection of a divider between this conveyor belt and an adjacent conveyor belt is performed. If absence of the divider is detected, the adjacent conveyor belt is determined to also belong to the first bay. Otherwise, the adjacent conveyor belt is determined not to belong to the first bay. This detection can be performed across multiple adjacent conveyor belts. In another example, prior to the start of the dispensing operation, input is received (e.g., from the remote control, from the remote computer system, or via the user interface of the item dispensing vehicle) indicating the conveyor belts that belong to the first bay. In yet another example, in addition to receiving the bay identifier, the item dispensing vehicle can receive, from the remote device, from the remote computer system, or via the user interface, identifiers of the conveyor belts that are to be operated.

In an example, the flow includes operation 1410, where the item dispensing vehicle causes the other set of conveyor belts to operate while an additional set of conveyor belts remains unoperated. The motor that is coupled to the driving shaft of the door can also be coupled to a driving shaft that is coupled to the first set of conveyor belts and the second set of conveyor belts. A first clutch is mechanically coupled with the driving shaft and is configured to selectively engage, via a rolling wheel, a first conveyor belt of the first set of conveyor belts. The first set of items is moved from the first bay to the door via the first set of conveyor belts and from the door to the first location via the third set of conveyor belts.

Figure 15:
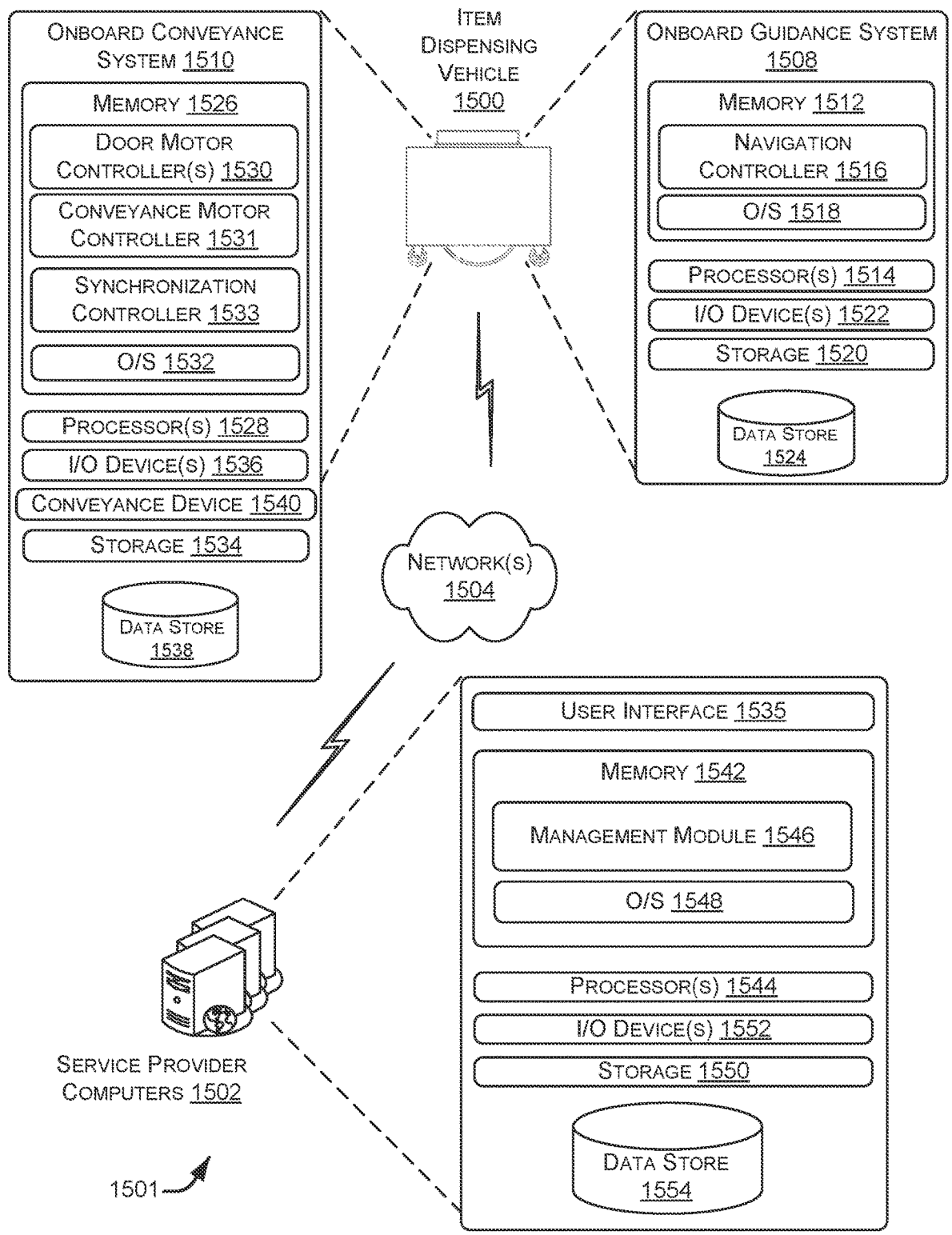
FIG. 15 is an example system architecture for implementing aspects of item dispensing in accordance with at least one embodiment.

FIG. 15 is an example system architecture for system 1501 that implements aspects of item conveyance, in accordance with at least one embodiment. The system 1501 may include service provider computers 1502. The service provider computers 1502 may support an electronic marketplace (not shown) and interface with purchase and delivery services of the electronic marketplace. In this manner, the service provider computers 1502 may coordinate receiving, storing, and/or delivering of items from a warehouse to one or more item drop-off locations. The service provider computers 1502 may be operated by, or on behalf of, the electronic marketplace provider or an operator. In some examples, the service provider computers 1502 may be a stand-alone service operated on its own or in connection with an electronic marketplace. In either example, the service provider computers 1502 may be in communication with an item dispensing vehicle 1500 via one or more network(s) 1504 (hereinafter, "the network 1504"). The network 1504 may include any one or a combination of many different types of networks, such as cable networks, the Internet, wireless networks, cellular networks, radio networks, and other private and/or public networks.

Turning now to the details of the item dispensing vehicle 1500 (an example of the item dispensing vehicle 100 in FIG. 1), the item dispensing vehicle 100 may include an onboard guidance system 1508 and an onboard conveyance system 1510. The onboard guidance system 1508 may include at least one memory 1512 and one or more processing units (or processor(s) 1514). The processor(s) 1514 may be implemented as appropriate in hardware, computer-executable instructions, software, firmware, or combinations thereof. Computer-executable instruction, software or firmware implementations of the processor(s) 1514 may include computer-executable or machine-executable instructions written in any suitable programming language to perform the various functions described.

The memory 1512 may include more than one memory and may be distributed throughout the onboard guidance system 1508. The memory 1512 may store program instructions (e.g., for a navigation controller 1516) that are loadable and executable on the processor(s) 1514, as well as data generated during the execution of these programs. The navigation controller 1516 may be configured to receive task assignments, planned paths, navigation information and/or instructions from management module 1546 and execute one or more navigational operations of the item dispensing vehicle 1500 according to data received. Depending on the configuration and type of memory including the navigation controller 1516, the memory 1512 may be volatile (such as random access memory (RAM)) and/or non-volatile (such as read-only memory (ROM), flash memory, or other memory). The memory 1512 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 1512 may include multiple different types of memory, such as static random access memory (SRAM), dynamic random access memory (DRAM), or ROM. Turning to the contents of the memory 1512 in more detail, the memory 1512 may include an operating system 1518 and one or more application programs, modules or services for implementing the features disclosed herein including at least the navigation controller 1516.

In some examples, the onboard guidance system 1508 may also include additional storage 1520, which may include removable storage and/or non-removable storage. The additional storage 1520 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1512 and the additional storage 1520, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard guidance system 1508. The modules of the onboard guidance system 1508 may include one or more components. The onboard guidance system 1508 may also include input/output (I/O) device(s) 1522 and/or ports, such as for enabling connection with a keyboard, a mouse, a pen, a voice input device, a touch input device, a display, speakers, a printer, or other I/O device. In at least some embodiments, the I/O device(s) 1522 may include with one or more sensors including any suitable combination of one or more imaging devices, one or more accelerometers, one or more gyroscopes, one or more scanning devices, or any suitable sensor configured to collect location information and/or conveyance information utilizing navigation-related fiducial markers and conveyance-related fiducial markers respectively.

The onboard guidance system 1508 may also include data store 1524. The data store 1524 may include one or more databases, data structures, or the like for storing and/or retaining information associated with the item dispensing vehicle 1500 (e.g., planned paths, conveyor belt-bay associations, bay-item associations, bay-dispensing location associations, execution step instructions, etc.) and/or location information obtained via one or more navigation-related fiducial markers.

The onboard conveyance system 1510 may include at least one memory 1526 and one or more processing units (or processor(s) 1528). The processor(s) 1528 may be implemented as appropriate in hardware, computer-executable instructions, software, firmware, or combinations thereof. Computer-executable instruction, software or firmware implementations of the processor(s) 1528 may include computer-executable or machine-executable instructions written in any suitable programming language to perform the various functions described.

The memory 1526 may include more than one memory and may be distributed throughout the onboard conveyance system 1510. The memory 1526 may store program instructions (e.g., for door motor controller(s) 1530, a conveyance motor controller 1531, and/or a synchronization controller 1533) that are loadable and executable on the processor(s) 1528, as well as data generated during the execution of these programs. Depending on the configuration and type of memory including the door motor controller(s) 1530, the conveyance motor controller 1531, and/or the synchronization controller 1533, the memory 1526 may be volatile (such as random access memory (RAM)) and/or non-volatile (such as read-only memory (ROM), flash memory, or other memory). The memory 1526 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 1526 may include multiple different types of memory, such as static random access memory (SRAM), dynamic random access memory (DRAM), or ROM. Turning to the contents of the memory 1526 in more detail, the memory 1526 may include an operating system 1532 and one or more application programs, modules or services for implementing the features disclosed herein.

In some examples, the door motor controller(s) 1530 may control one or more motors (e.g., motor 1174 in FIG. 11) associated with opening and closing a door (e.g., door 1106 in FIG. 11) of the item dispensing vehicle 1500. The item dispensing vehicle 1500 may include multiple door motors, so the onboard conveyance system 1510 can include a door motor controller 1530 associated with each door motor. If the item dispensing vehicle 1500 includes multiple door motors, the synchronization controller 1533 can synchronize the door motor controller(s) 1530. The conveyance motor controller 1531 can include a shaft driver and a microcontroller for controlling a motor (e.g., motor 1034 in FIG. 10) associated with conveyor belts (e.g., conveyor belts 1028 and conveyor belts 1018 in FIG. 10) of the housing and the door of the item dispensing vehicle 1500.

In some examples, the onboard conveyance system 1510 may also include additional storage 1534, which may include removable storage and/or non-removable storage. The additional storage 1534 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1526 and the additional storage 1534, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard conveyance system 1510. The modules of the onboard conveyance system 1510 may include one or more components. The onboard conveyance system 1510 may also include input/output (I/O) device(s) 1536 and/or ports, such as for enabling connection with a keyboard, a mouse, a pen, a voice input device, a touch input device, a display, speakers, a printer, or other I/O device. In at least some embodiments, the I/O device(s) 1536 may include with one or more sensors including any suitable combination of one or more imaging devices, one or more accelerometers, one or more gyroscopes, one or more load cells, one or more scanning devices, or any suitable sensor configured to collect conveyance information utilizing conveyance-related fiducial markers and/or item information associated with an item being conveyed.

The onboard conveyance system 1510 may also include data store 1538. The data store 1538 may include one or more databases, data structures, or the like for storing and/or retaining conveyance information obtained by the item dispensing vehicle 1500.

In some embodiments, the onboard conveyance system 1510 may include conveyance device 1540 (or more than one conveyance device). A conveyance device may include a conveyor belt, a tilt plane, a robotic arm, or any suitable device that is mounted to the item dispensing vehicle 1500 which is operable to transfer items to and from the item dispensing vehicle 1500. The door motor controller(s) 1530 and/or the conveyance motor controller 1531 may be configured to instruct and/or operate the conveyance device 1540 utilizing the conveyance information obtained from one or more conveyance-related fiducial markers. In at least one embodiment, the onboard conveyance system 1510 may be communicatively coupled with the management module 1546 and/or the onboard guidance system 1508, while in other examples, the onboard conveyance system 1510 may operate in a stand-alone capacity without communicating with the management module 1546 and/or the onboard guidance system 1508.

The service provider computers 1502, perhaps arranged in a cluster of servers or as a server farm, may be configured to manage the item dispensing vehicle 1500 as part of an delivery system. The service provider computers 1502 may include at least one memory 1542 and one or more processing units (or processor(s)) 1544. The processor(s) 1544 may be implemented as appropriate in hardware, computer-executable instructions, software, firmware, or combinations thereof. Computer-executable instruction, software or firmware implementations of the processor(s) 1544 may include computer-executable or machine-executable instructions written in any suitable programming language to perform the various functions described.

The memory 1542 may include more than one memory and may be distributed throughout the service provider computers 1502. The memory 1542 may store program instructions (e.g., related to the management module 1546) that are loadable and executable on the processor(s) 1544, as well as data generated during the execution of these programs. Depending on the configuration and type of memory including the management module 1546, the memory 1542 may be volatile (such as random access memory (RAM)) and/or non-volatile (such as read-only memory (ROM), flash memory, or other memory). The service provider computers 1502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1542 may include multiple different types of memory, such as static random access memory (SRAM), dynamic random access memory (DRAM), or ROM.

Turning to the contents of the memory 1542 in more detail, the memory 1542 may include an operating system 1548 and one or more application programs, modules or services for implementing the features disclosed herein including the management module 1546. The management module 1546 may be configured to assign tasks to the item dispensing vehicle 1500. In some examples, the management module 1546 may select the item dispensing vehicle 1500 from a set of item dispensing vehicles based on a current location of the item dispensing vehicle 1500, one or more locations associated with the task, various capabilities and/or attributes of the item dispensing vehicle 1500 (e.g., a speed capability, a maximum load capacity, etc.), other tasks assigned to one or more item dispensing vehicles, or any suitable combination of the above. Additionally, the management module 1546 may be configured to generate and transmit task assignments and/or navigation instructions (e.g., planned path instructions) to the navigation controller 1516. In some embodiments, the management module 1546 may be configured to generate and transmit information to the door motor controller(s) 1530 and/or the conveyance motor controller 1531 such as task assignments, conveyance information, item information, or any suitable information for obtaining and/or delivering an item.

In some examples, the service provider computers 1502 may also include additional storage 1550, which may include removable storage and/or non-removable storage. The additional storage 1550 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1542 and the additional storage 1550, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 1502. The modules of the service provider computers 1502 may include one or more components. The service provider computers 1502 may also include input/output (I/O) device(s) 1552 and/or ports, such as for enabling connection with a keyboard, a mouse, a pen, a voice input device, a touch input device, a display, speakers, a printer, or other I/O device.

In some examples, the service provider computers 1502 may also include data store 1554. The data store 1554 may include one or more databases, data structures, or the like for storing and/or retaining any suitable information associated with the service provider computers 1502. In some examples, the service provider computers 1502 may store the item information associated with various items, task assignments, planned paths, location information obtained from the item dispensing vehicle 1500, conveyance information, or any suitable information related to the examples provided herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An item dispensing vehicle comprising:
    a movable base; and
    an item dispensing housing mounted on the movable base and configured to retain and dispense items, the item dispensing housing comprising:
        a first bay configured to retain a first set of items on a first set of conveyor belts that ends at a first opening;
        a second bay configured to retain a second set of items on a second set of conveyor belts that ends at a second opening;
        a divider positioned between the first bay and the second bay;
        a driving shaft selectively coupled with the first set of conveyor belts and the second set of conveyor belts via a set of clutches to selectively engage the first set of conveyor belts and the second set of conveyor belts; and
    a door comprising a third set of conveyor belts and operable between one or more open positions and a closed position, the door blocking the first opening and the second opening in the closed position, the first opening and the second opening being at least partially unblocked in a first open position of the one or more open positions.

2. The item dispensing vehicle of claim 1, further comprising:
    a computer system comprising one or more processors and one or more memory storing instructions that, upon execution by the one or more processor, configure the computer system to:
        determine that the first set of items is to be dispensed to a first location outside of the item dispensing vehicle;
        cause the door to move to the first open position;
        cause the third set of conveyor belts to operate while the door is in the first open position;
        determine that the first set of conveyor belts is to be operated; and
        cause the first set of conveyor belts to operate while the second set of conveyor belts remains unoperated, wherein the first set of items is moved from the first bay to the door via the first set of conveyor belts and from the door to the first location via the third set of conveyor belts.

3. The item dispensing vehicle of claim 2, wherein the execution of the instructions further configures the computer system to:
  determine that the second set of items is to be dispensed to a second location outside of the item dispensing vehicle;
  determine, based at least in part on the second location or the second set of items, a second open position for the door;
  cause the door to move to the second open position, wherein the second open position uses a different angle than the first open position;
  cause the third set of conveyor belts to operate while the door is in the second open position;
  determine that the second set of conveyor belts is to be operated; and
  cause the second set of conveyor belts to operate while the first set of conveyor belts remains unoperated, wherein the second set of items is moved from the second bay to the door via the second set of conveyor belts and from the door to the second location via the third set of conveyor belts.

4. The item dispensing vehicle of claim 2, wherein the execution of the instructions further configures the computer system to:
  receive, from a device, a command to dispense the first set of items, the command including a bay identifier;
  determine that the bay identifier is associated with the first bay;
  determine, based at least in part on a bay-to-conveyor belt mapping or divider sensing, that a first conveyor belt and a second conveyor belt are associated with the first bay; and
  causing a first clutch to engage a first rolling wheel of the first conveyor belt and a second clutch to engage a second rolling wheel of the second conveyor belt.

5. A system comprising:
  a first bay configured to retain a first set of items on a first item transporting medium that ends at a first opening;
  a second bay configured to retain a second set of items on a second item transporting medium that ends at a second opening; and
  a driving shaft selectively coupled with the first item transporting medium and the second item transporting medium via a set of clutches to selectively engage the first item transporting medium and the second item transporting medium.

6. The system of claim 5 further comprising:
  a divider positioned between the first bay and the second bay, wherein the first item transporting medium comprises a first conveyor belt, and wherein the second item transporting medium comprises a second conveyor belt;
  a door operable between one or more open positions and a closed position and comprising a third conveyor belt, the door blocking the first opening and the second opening in the closed position, the first opening and the second opening being at least partially unblocked in a first open position of the one or more open positions;
  a movable base;
  an item dispensing housing mounted on the movable base and configured to retain and dispense items, the item dispensing housing comprising the first bay, the second bay, the divider, and the door; and
  a computer system comprising one or more processors and one or more memory storing instructions that, upon execution by the one or more processor, configure the computer system to:
    determine that the first set of items is to be dispensed;
    cause the door to move to an open position;
    cause the third conveyor belt to operate;
    determine that the first conveyor belt is to be operated; and
    cause the first conveyor belt to operate while the second conveyor belt remains unoperated,
  wherein the first set of items is moved from the first bay to the door via the first conveyor belt and from the door to a location outside of the item dispensing vehicle via the third conveyor belt.

7. The system of claim 5 further comprising:
  a motor, wherein the driving shaft is mechanically coupled with the motor;
  a first clutch mechanically coupled with the driving shaft and configured to selectively engage, via a first rolling wheel, the first item transporting medium; and
  a second clutch mechanically coupled with the driving shaft and configured to selectively engage, via a second rolling wheel, the second item transporting medium.

8. The system of claim 7 further comprising:
  a door comprising a third item transporting medium and operable between one or more open positions and a closed position, the door blocking the first opening and the second opening in the closed position, the first opening and the second opening being at least partially unblocked in an open position of the one or more open positions; and
  an idler shaft mechanically coupled with the first item transporting medium and the third item transporting medium, wherein the first opening and the second opening are relatively closer to the driving shaft than the idler shaft, and wherein the door is positioned relatively closer to the driving shaft than the idler shaft.

9. The system of claim 5 further comprising:
  a sensor configured to detect divider presence or divider absence of a divider between the first bay and the second bay, wherein the divider comprises a protrusion inserted in a recess.

10. The system of claim 5, wherein the driving shaft is a first driving shaft, and further comprising:
  a door comprising a third item transporting medium;
  a motor mechanically coupled with the first driving shaft; and
  a second driving shaft included in the door, mechanically coupled with the motor, and coupled with the third item transporting medium.

11. The system of claim 10, wherein the door comprises a sidewall, wherein the third item transporting medium comprises and a conveyor belt, wherein the conveyor belt extends along a first plane, wherein the sidewall extends along a second plane that intersects the first plane.

12. The system of claim 11, further comprising:
  a motor positioned on a wall that defines at least a portion of the first bay, wherein the sidewall comprises a gear that is mechanically coupled with the motor.

13. The system of claim 11, wherein the sidewall comprises a retractable push device, wherein the retractable push device is in a retracted position while the door is in a closed position, and wherein the retractable push device is in an extended position over at least a portion of the conveyor belt of the door while the door is in an open position.

14. The system of claim 11 further comprising:
a sensor, wherein the sidewall comprises a protrusion or a recess, wherein the sensor is configured to detect the protrusion or the recess and generate sensor data indicating a position of the door.

15. The system of claim 5 further comprising:
a spring loaded tensioner coupled to a conveyor belt of the first item transporting medium and comprising a rolling wheel, a base, and a spring, wherein the base is configured to slide between positions in a first direction parallel to the conveyor belt based at least in part on the spring, and wherein the rolling wheel is configured to tension the conveyor belt in a second direction based least in part on a position of the base.

16. The system of claim 5, further comprising:
a door; and
a camera positioned on a wall above the door, wherein the camera is configured to generate image data of an area surrounding the door.

17. The system of claim 16, further comprising:
a computer system comprising one or more processors and one or more memory storing instructions that, upon execution by the one or more processor, configure the computer system to:
  generate, based at least in part on processing the image data, at least one of: a confirmation of a dispensing of the first set of items at a location or position data of the door relative to a delivery surface.

18. The system of claim 5 further comprising:
a movable base;
an item dispensing housing mounted on the movable base and configured to retain and dispense items, the item dispensing housing comprising the first bay, the second bay, a divider between the first bay and the second bay, and a door
a flooring positioned between the item dispensing housing and the movable base, wherein the flooring defines an opening for a cable to extend from an electronic component in the movable base into the item dispensing housing;
a first grommet defining an inner hole, wherein the first grommet is positioned within the opening and around the cable; and
a second grommet positioned within an inner hole of the first grommet and around the cable, wherein the flooring, the first grommet, and the second grommet are configured to provide a water-resistant seal between the item dispensing housing and the movable base.

19. A method comprising:
determining that a first set of items is to be dispensed from a first bay of a plurality of bays of an item dispensing housing;
causing a door of the item dispensing housing to move to an open position, the door being operable between one or more open positions and a closed position, the door blocking the plurality of bays in the closed position, the plurality of bays being at least partially unblocked in the open position of the one or more open positions;
causing a first item transporting medium included in the door to operate;
determining that a second item transporting medium included in the first bay is to be operated; and
causing the second item transporting medium to operate while a remaining set of item transporting media included in the item dispensing housing remains unoperated,
wherein the first set of items is moved from the first bay to the door via the second item transporting medium and from the door to a location outside of the item dispensing housing via the first item transporting medium.

20. The method of claim 19 further comprising:
determining a presence of a divider between the first bay and a second bay adjacent to the first bay; and
determining, based at least in part on the presence of the divider, that only the first item transporting medium is to be operated.

21. The method of claim 19 further comprising:
determining a trigger associated with dispensing the first set of items;
selecting, based at least in part on the trigger, the second item transporting medium to operate;
determining a clutch associated with the second item transporting medium; and
causing the clutch to engage the second item transporting medium.

22. The method of claim 21, wherein determining the trigger comprises:
receiving, from a device, a command associated with dispensing the first set of items, wherein the command indicates a bay identifier; and
determining that the bay identifier is associated with the first bay, wherein the second item transporting medium is selected based at least in part on a determination that that the second item transporting medium is associated with the first bay.

23. The method of claim 22 further comprising:
determining that a first conveyor belt is pre-associated with at least one of the first bay or the bay identifier;
determining that no divider is present between the first conveyor belt and a second conveyor belt that is adjacent to the first conveyor belt; and
identifying the first conveyor belt and the second conveyor belt as belonging to the second item transporting medium that is to be operated.

24. The method of claim 22, wherein determining the trigger comprises:
receiving, from a device, a command associated with dispensing the first set of items, wherein the command indicates a bay identifier;
determining that the bay identifier is associated with the first bay; and
determining that a first conveyor belt of the item transporting medium is associated with at least one of the first bay or the bay identifier.

25. The method of claim 21 further comprising:
determining that a first conveyor belt is pre-associated with the first bay;
determining that no divider is present between the first conveyor belt and a second conveyor belt that is adjacent to the first conveyor belt;
sending, to a device, an indication that the first conveyor belt and the second conveyor belt belong to the second item transporting medium; and
receiving, from the device based at least in part on the indication, a command to operate the first bay, wherein the trigger comprises the command.

26. The method of claim 21 further comprising:
determining a first location to which the first set of items are to be dispensed;
determining a second location associated with the item dispensing housing;

determining a match between the first location and the second location, wherein the trigger is based at least in part on the match; and determining that the first bay is associated with the first location.

27. The method of claim 19 further comprising:

determining that the door has been moved to the open position, wherein operating the first set of conveyor belts occurs after the determining that the door has been moved to the open position.

28. The method of claim 27 further comprising:

determining an angle at which the door is to be operated, wherein the angle corresponds to the open position and is either associated with a location to which the first set of items is to be dispensed or determined based at least in part on sensor data, wherein the sensor data is generated by a set of sensors of the item dispensing housing.

* * * * *